United States Patent
Minamikawa et al.

(10) Patent No.: US 10,528,302 B2
(45) Date of Patent: Jan. 7, 2020

(54) IMAGE FORMING APPARATUS AND COMPUTER-READABLE STORAGE MEDIUM

(71) Applicant: BROTHER KOGYO KABUSHIKI KAISHA, Nagoya-shi, Aichi (JP)

(72) Inventors: Shunsuke Minamikawa, Nagoya (JP); Kenta Horade, Tokai (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

(21) Appl. No.: 16/218,627

(22) Filed: Dec. 13, 2018

(65) Prior Publication Data
US 2019/0199870 A1 Jun. 27, 2019

(30) Foreign Application Priority Data
Dec. 27, 2017 (JP) ................................ 2017-252599

(51) Int. Cl.
*G06F 3/12* (2006.01)
*H04N 1/00* (2006.01)
(Continued)

(52) U.S. Cl.
CPC ......... *G06F 3/1219* (2013.01); *G03G 15/556* (2013.01); *G06F 3/1205* (2013.01);
(Continued)

(58) Field of Classification Search
CPC .... G06F 3/1219; G06F 3/1218; G03G 15/556
See application file for complete search history.

(56) References Cited

U.S. PATENT DOCUMENTS 5,459,556 A * 10/1995 Acquaviva ............. G03G 15/08
118/688
5,802,420 A * 9/1998 Garr ..................... B41J 2/17566
399/27
(Continued)

FOREIGN PATENT DOCUMENTS

JP 2008-076550 A 4/2008

OTHER PUBLICATIONS

Canon PRO-6000 Online Manual, Cover page and p. 346, retrieved from URL: http://cdn.cnetcontent.com/a9/b9/a9b957fd-5b5e-4695-9dba-02ca33c8841b.pdf.
(Continued)

*Primary Examiner* — Ted W Barnes
(74) *Attorney, Agent, or Firm* — Scully, Scott, Murphy & Presser, P.C.

(57) ABSTRACT

An image forming apparatus, having a recorder, a display, an input interface, a memory, and a controller, is provided. The controller is configured to control the recorder to consume colorant to print images on sheets, count a consumption value and a quantity of the sheets consumed, determine an average usage value based on the consumption value and the quantity of the sheets, obtain a filled amount value and determine a first printable quantity, determine a second printable quantity, control the display to display a first screen including a first object indicating the first printable quantity in the display, control the display to display a second screen including a second object indicating the second printable quantity in the display, and control the display to display a screen including a third object, through which one of the first object and the second object to be displayed in the display is selectable.

15 Claims, 17 Drawing Sheets

(51) Int. Cl.
    *H04N 1/23*    (2006.01)
    *G03G 15/00*   (2006.01)
(52) U.S. Cl.
    CPC .......... *G06F 3/1218* (2013.01); *G06F 3/1229*
        (2013.01); *H04N 1/00411* (2013.01); ***H04N
        1/00437* (2013.01); *H04N 1/00482*** (2013.01);
        *H04N 1/00644* (2013.01); *H04N 1/2346*
        (2013.01)

(56)         References Cited

U.S. PATENT DOCUMENTS

| | | | | |
|---|---|---|---|---|
| 6,430,711 | B1* | 8/2002 | Sekizawa | G06F 11/3006 |
| | | | | 358/1.14 |
| 7,061,391 | B2* | 6/2006 | Hopper | G06K 15/00 |
| | | | | 340/525 |
| 10,367,955 | B2* | 7/2019 | Hitaka | H04N 1/00344 |
| 2005/0068562 | A1* | 3/2005 | Ferlitsch | G06F 3/1208 |
| | | | | 358/1.14 |
| 2007/0216930 | A1* | 9/2007 | Jacobs | G06K 15/00 |
| | | | | 358/1.14 |
| 2007/0257954 | A1* | 11/2007 | Nishizaka | B41J 2/17509 |
| | | | | 347/14 |
| 2008/0111842 | A1* | 5/2008 | Hall | B41J 2/17566 |
| | | | | 347/7 |
| 2010/0053673 | A1* | 3/2010 | Oba | G03G 21/02 |
| | | | | 358/1.15 |
| 2011/0007359 | A1* | 1/2011 | Yamakawa | G03G 15/502 |
| | | | | 358/1.15 |
| 2011/0032549 | A1* | 2/2011 | Komatsu | G06F 3/1219 |
| | | | | 358/1.9 |
| 2012/0320410 | A1* | 12/2012 | Kakegawa | G06F 3/1219 |
| | | | | 358/1.15 |
| 2015/0003847 | A1* | 1/2015 | Yang | G03G 15/556 |
| | | | | 399/27 |
| 2015/0153696 | A1* | 6/2015 | Oya | G03G 15/556 |
| | | | | 399/27 |
| 2015/0220034 | A1* | 8/2015 | Haruta | G03G 15/556 |
| | | | | 399/27 |
| 2016/0286059 | A1* | 9/2016 | Hitaka | H04N 1/00344 |

OTHER PUBLICATIONS

"Professional Fine Art Photographers Prepare to Obsess as Canon U.S.A. Announces New Large-Format imagePROGRAF Inkjet Printer", Press Release, Melville, N.Y., Jul. 20, 2017.

* cited by examiner

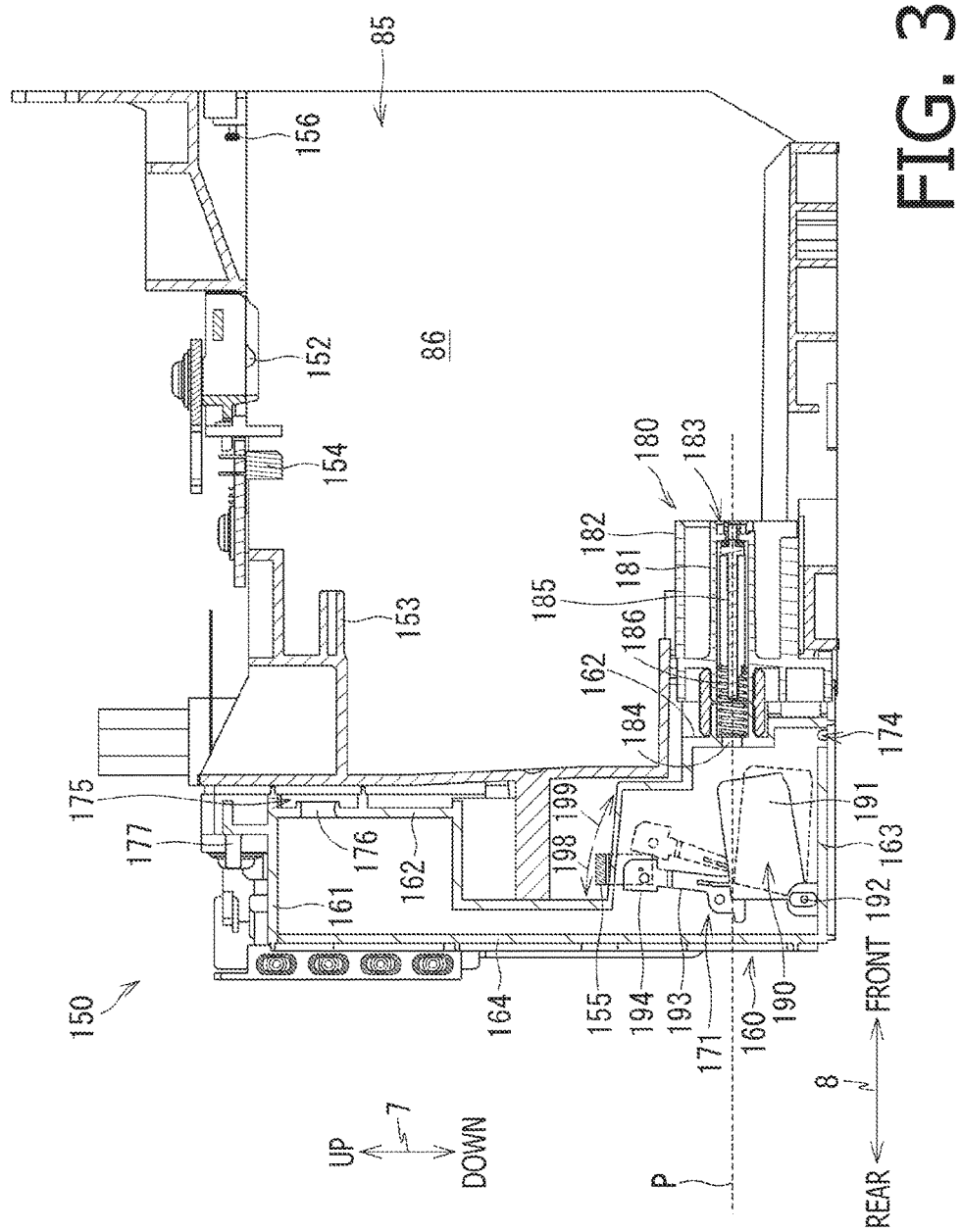

IMAGE FORMING APPARATUS AND COMPUTER-READABLE STORAGE MEDIUM

CROSS REFERENCE TO RELATED APPLICATION

This application claims priority under 35 U.S.C. § 119 from Japanese Patent Application No. 2017-252599, filed on Dec. 27, 2017, the entire subject matter of which is incorporated herein by reference.

BACKGROUND

Technical Field

The present disclosure is related to an aspect of an image forming apparatus capable of displaying a quantity of printable sheets in a display.

Related Art

An image forming apparatus may display a quantity of sheets printable in a remaining colorant in a display device. The image forming apparatus may calculate an area dimension ratio, which is a ratio of an area dimension of an image with respect to a printable area on a sheet. The image forming apparatus may calculate the area dimension ratio each time an image is formed on a sheet and calculate an average image-area dimension ratio. The image forming apparatus may calculate how many sheets of images may be formed in the remaining toner based on the average image-area dimension ratio and display the number obtained by the calculation as a printable quantity in the display device.

SUMMARY

The calculation to obtain the printable quantity may be effective to know how further images may be formed by the image forming apparatus when a style of the images to be printed is approximate to that of the images used for the calculation. In other words, if usage of the image forming apparatus is limited to a specific style, e.g., document printing or picture printing, the calculated printable quantity may be close to an actual printable quantity. Meanwhile, if, for example, multiple users use the image forming apparatus for printing images in different styles, the actual printable quantity may differ from the calculated printable quantity, and troubles may be caused. For example, if the image forming apparatus having been used mainly for document printing is now used for picture printing, larger amounts of colorants than the average document printing may be used, and the colorants may run out before the calculated printable quantity of images are printed. For another example, if the image forming apparatus having been used mainly for picture printing is now used for document printing, as the images are printed on sheets, printable quantity being the quantity of sheets of images estimated to be printable in the remaining colorants may be reduced in a slower pace than an actual sheet-consuming pace, which may be confusing to a user.

Meanwhile, International Organization for Standardization (ISO) prescribes a standard quantity of sheets printable in an image forming apparatus. In particular, ISO prescribes a standard printable quantity, which is a quantity of sheets printable when an image of a predetermined pattern is printed on a predetermined type of sheets in a predetermined image forming apparatus with a predetermined type of colorant cartridge attached thereto. The standard printable quantity is a unified standard and may provide a useful reference, which may be reliable to some extent, to users. However, the standard printable quantity may differ largely from an actual printable quantity to a user, for example, for picture printing.

In this regard, presenting a printable quantity calculated on basis of a user's past usage style and presenting a standard printable quantity may each contain an advantage and a disadvantage.

The present disclosure is advantageous in that an image forming apparatus capable of presenting a printable quantity based on a user's preference between a printable quantity based on the user's past usage style and a standard printable quantity, is provided.

According to an aspect of the present disclosure, an image forming apparatus, having a recorder connected with a container configured to store a colorant, a display, an input interface, a memory, and a controller, is provided. The controller is configured to control the recorder to consume the colorant to print images on sheets; count a consumption value reflecting an amount of the colorant consumed by the recorder and a quantity of the sheets used to print the images; determine an average usage value based on the consumption value and the quantity of the sheets; obtain a filled amount value indicating an amount of the colorant filled in the container and determine a first printable quantity based on the obtained filled amount value, the counted consumption value, and a standard usage value stored in the memory; determine a second printable quantity based on the filled amount value, the consumption value, and the average usage value; control the display to display a first screen including a first object in the display, the first object indicating the first printable quantity; control the display to display a second screen including a second object in the display, the second object indicating the second printable quantity; and control the display to display a screen including a third object, through which one of the first object and the second object to be displayed in the display is selectable.

According to another aspect of the present disclosure, a non-transitory computer readable storage medium storing computer readable instructions that are executable by a computer in an image forming apparatus, which has a recorder connected with a container configured to store a colorant, a display, an input interface, and a memory, is provided. The computer readable instructions, when executed by the computer, cause the computer to control the recorder to consume the colorant to print images on sheets; count a consumption value reflecting an amount of the colorant consumed by the recorder and a quantity of the sheets used to print the images; determine an average usage value reflecting the consumption value and the quantity of the sheets; obtain a filled amount value indicating an amount of the colorant filled in the container and determine a first printable quantity reflecting the obtained filled amount value, the counted consumption value, and a standard usage value stored in the memory; determine a second printable quantity reflecting the filled amount value, the consumption value, and the average usage value; control the display to display a first screen including a first object in a first screen in the display, the first object indicating the first printable quantity; control the display to display a second screen including a second object in the display, the second object indicating the second printable quantity; and control the display to display a screen including a third object, through which one of the first object and the second object to be displayed in the display is selectable.

BRIEF DESCRIPTION OF THE ACCOMPANYING DRAWINGS

FIG. 1A is a perspective exterior view of a printer 10 according to an embodiment of the present disclosure with a cover 87 at a covering position. FIG. 1B is a perspective exterior view of the printer 10 according to the embodiment of the present disclosure with the cover 87 at an exposing position.

FIG. 3 is a cross-sectional view of an attachment case 150 in the printer 10 according to the embodiment of the present disclosure.

Figure 5:
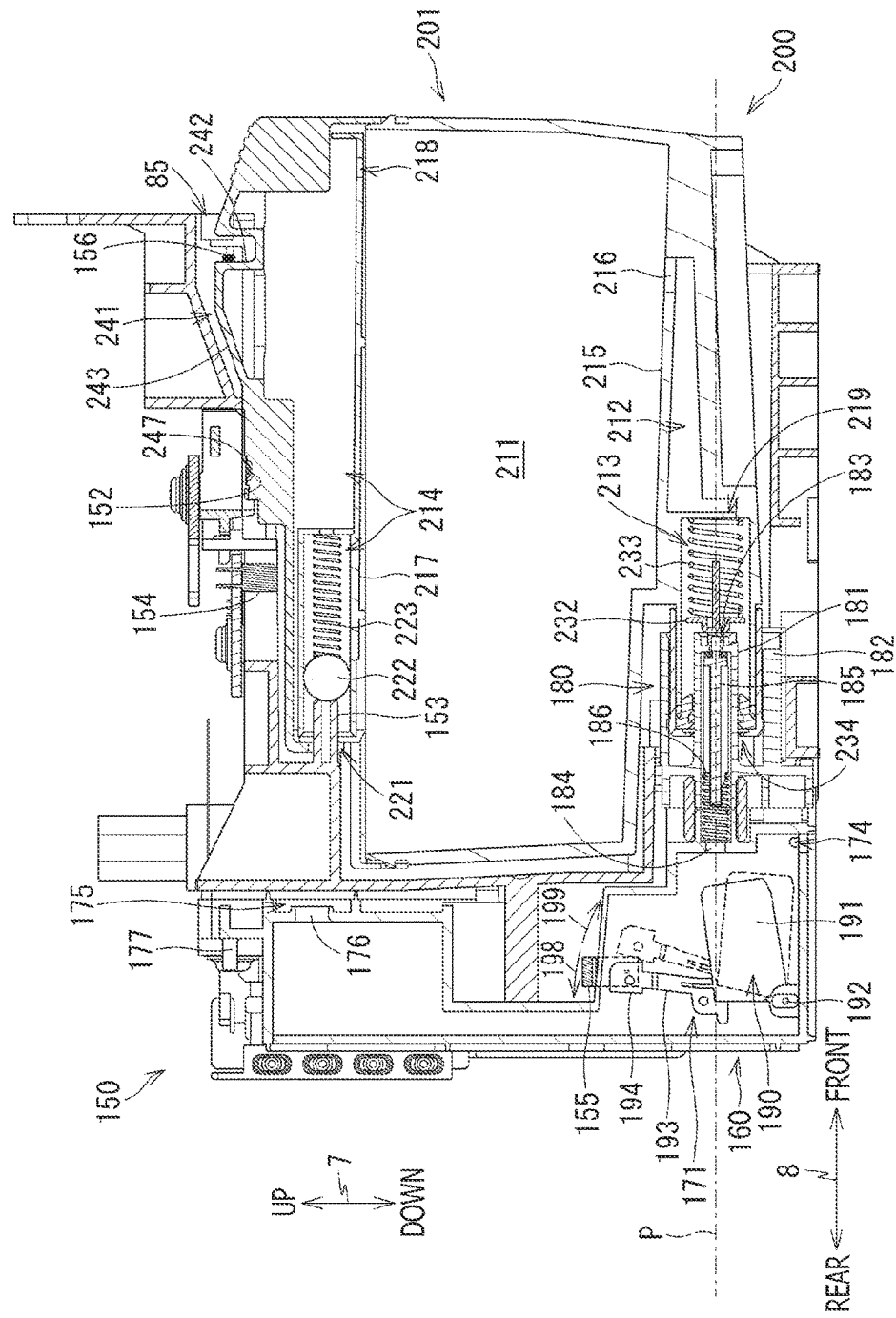

FIG. 5 is a cross-sectional view of the attachment case 150 with the cartridge 200 attached thereto in the printer 10 according to the embodiment of the present disclosure.

Figure 6:
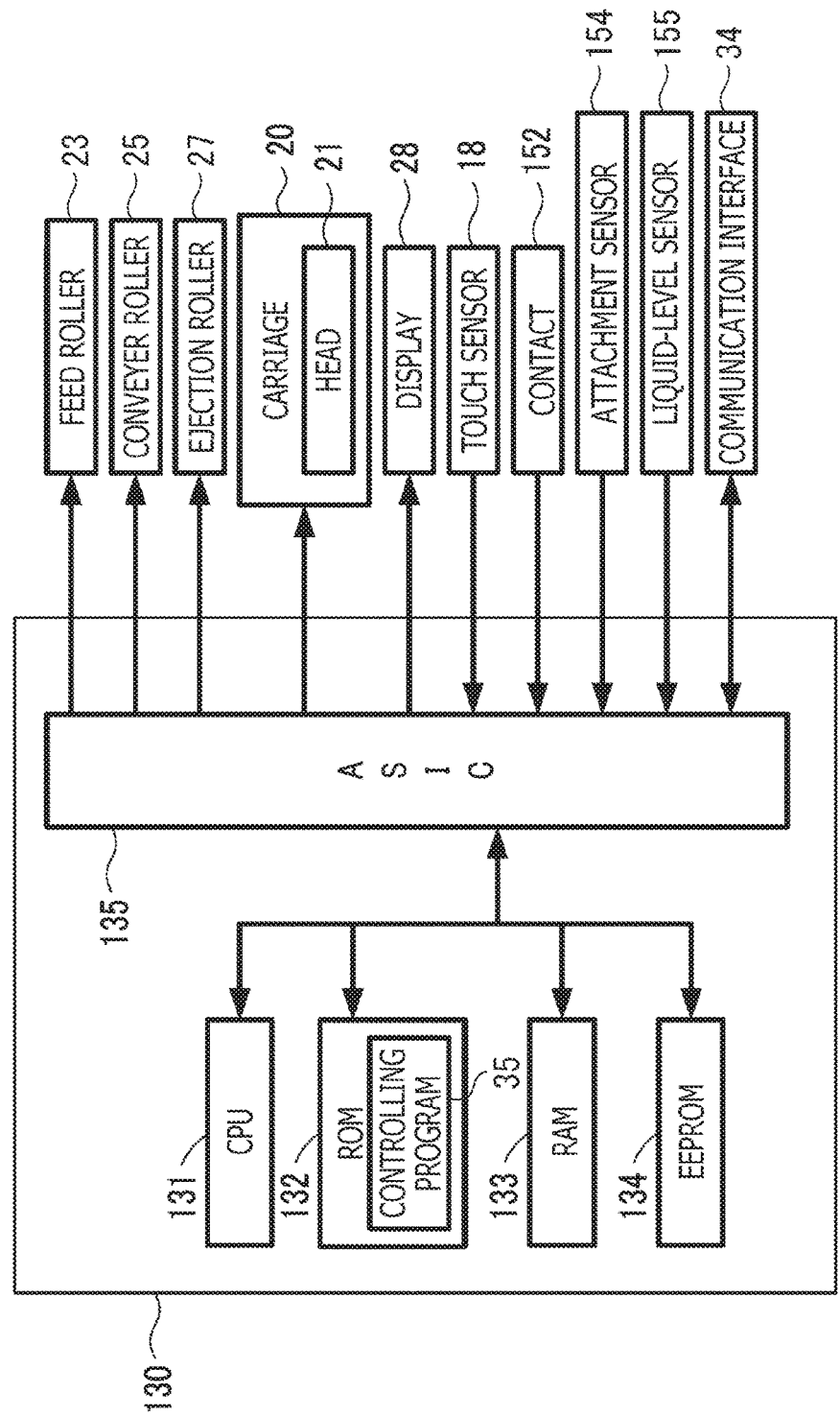

FIG. 6 is a block diagram to illustrate a functional configuration in the printer 10 according to the embodiment of the present disclosure.

Figure 7:
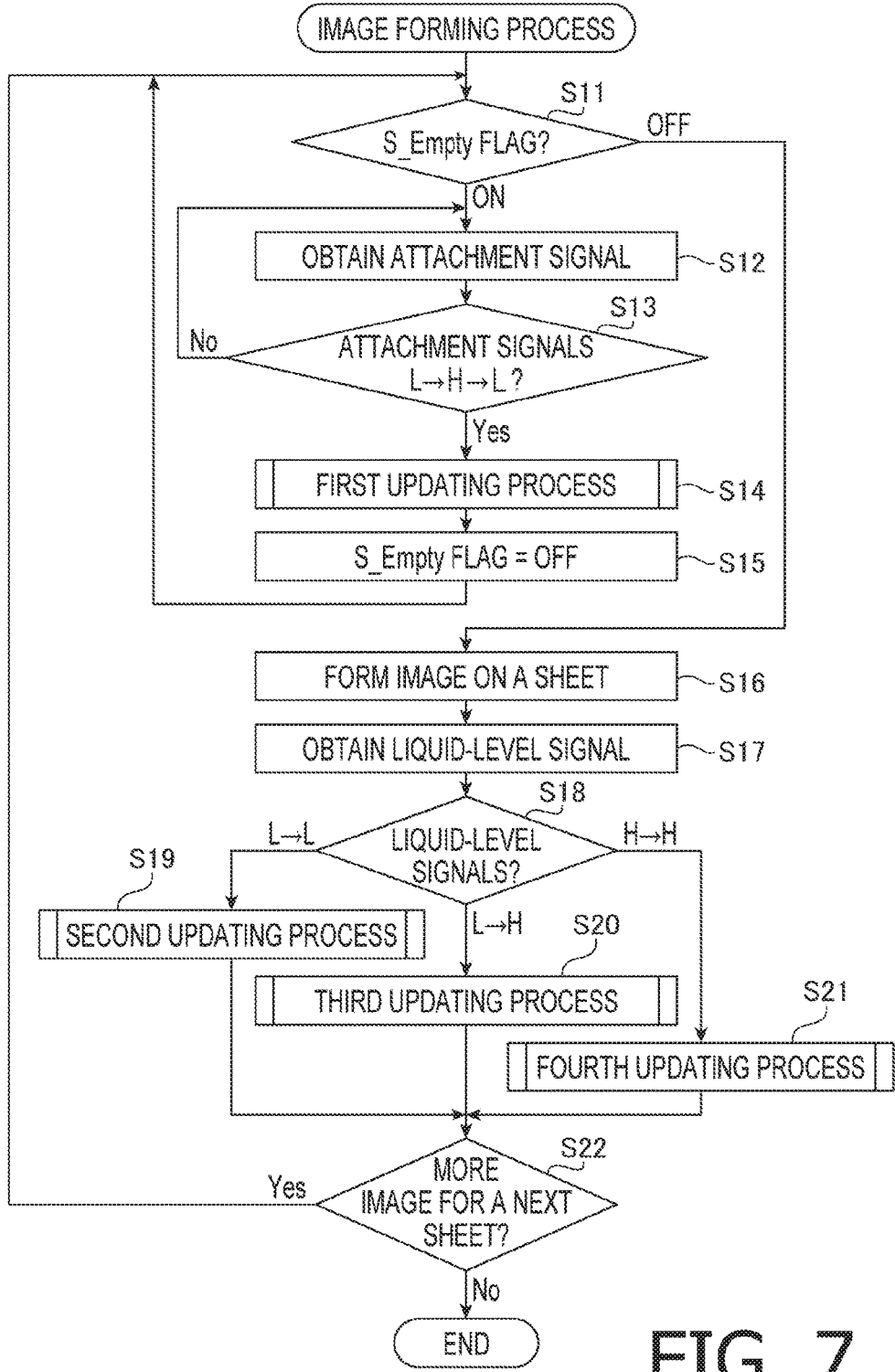

FIG. 7 is a flowchart to illustrate a flow of steps in an image forming process to be conducted in the printer 10 according to the embodiment of the present disclosure.

FIGS. 8A-8D are flowcharts to illustrate flows of steps in first, second, third, and fourth updating processes to be conducted in the printer 10 according to the embodiment of the present disclosure.

Figure 9:
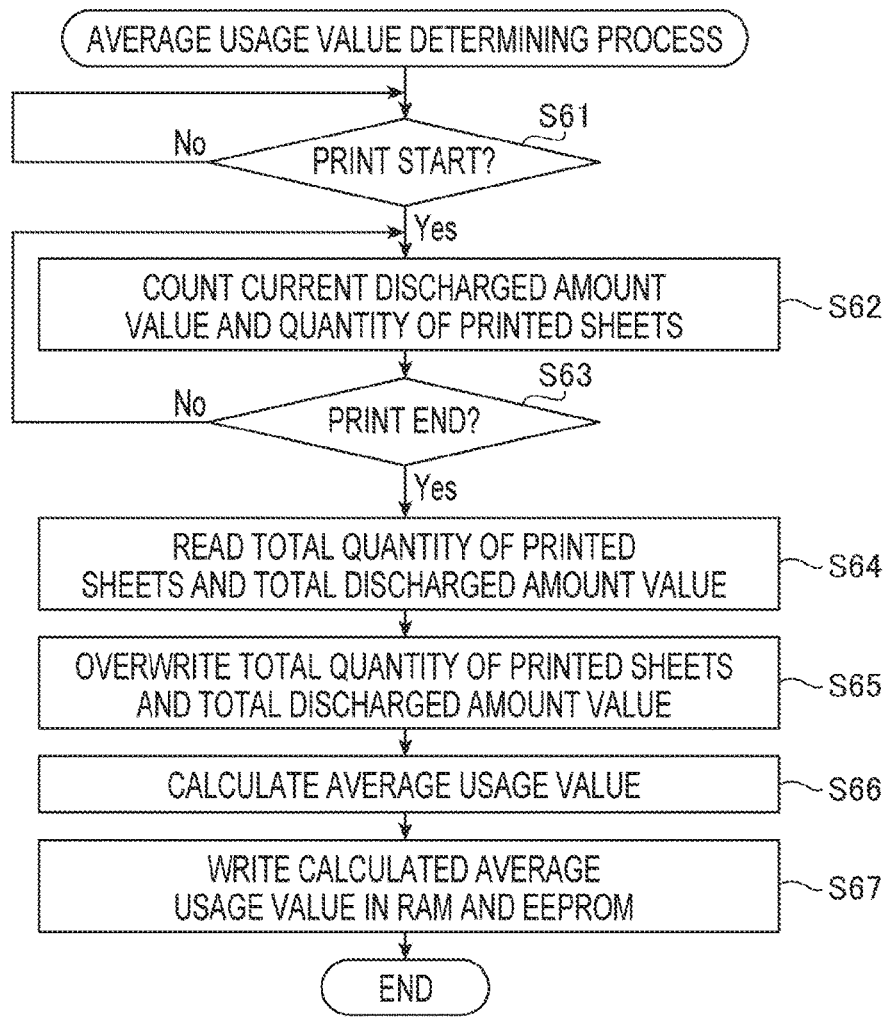

FIG. 9 is a flowchart to illustrate a flow of steps in an average usage determining process according to the embodiment of the present disclosure.

Figure 10:
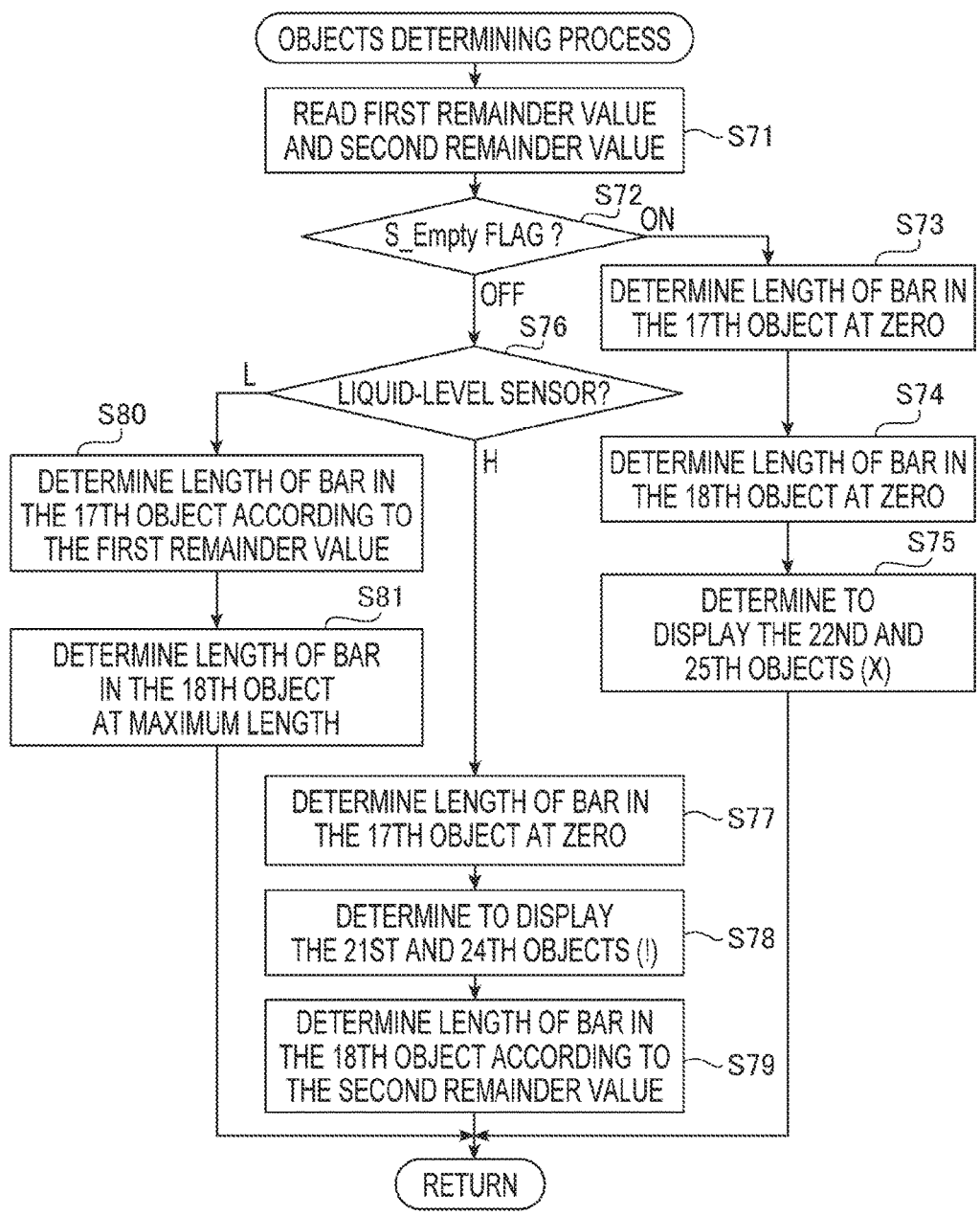

FIG. 10 is a flowchart to illustrate a flow of steps in an objects determining process to be conducted in the printer 10 according to the embodiment of the present disclosure.

Figure 11A:
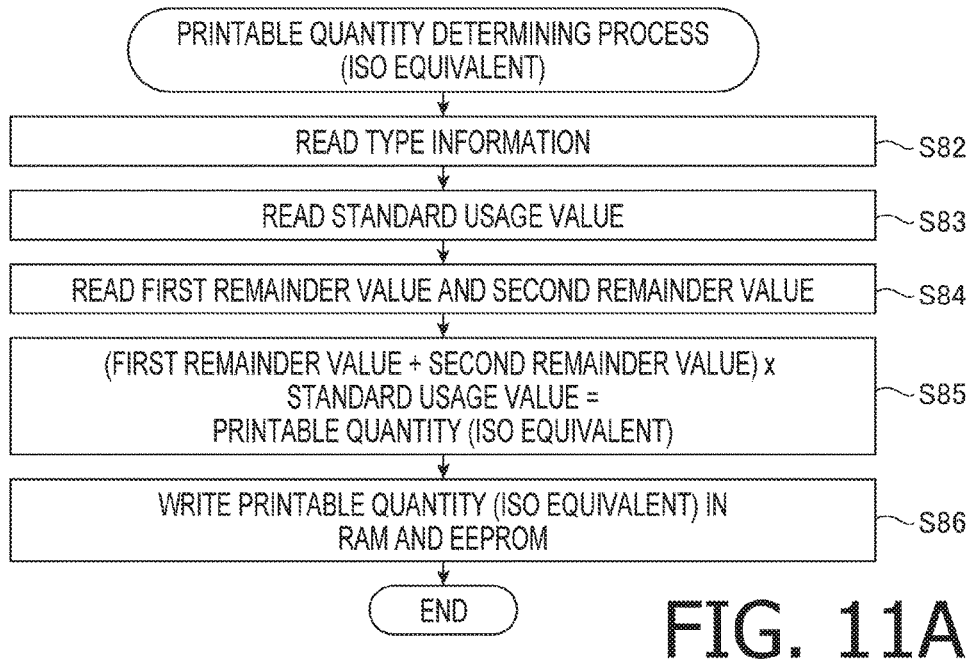
Figure 11B:
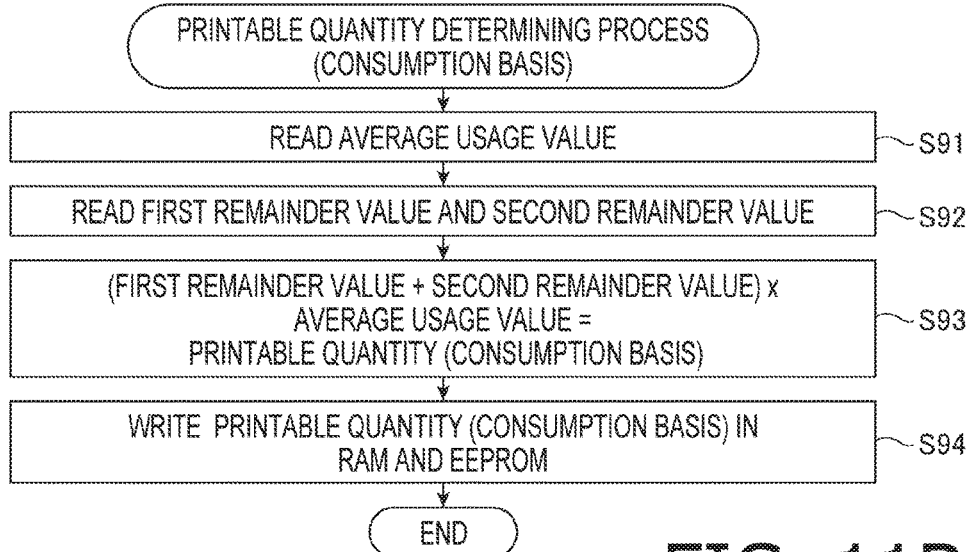

FIG. 11A is a flowchart to illustrate a flow of steps in a printable quantity determining process (ISO equivalent) according to the embodiment of the present disclosure. FIG. 11B is a flowchart to illustrate a flow of steps in a printable quantity determining process (consumption basis) according to first embodiment of the present disclosure.

Figure 12:
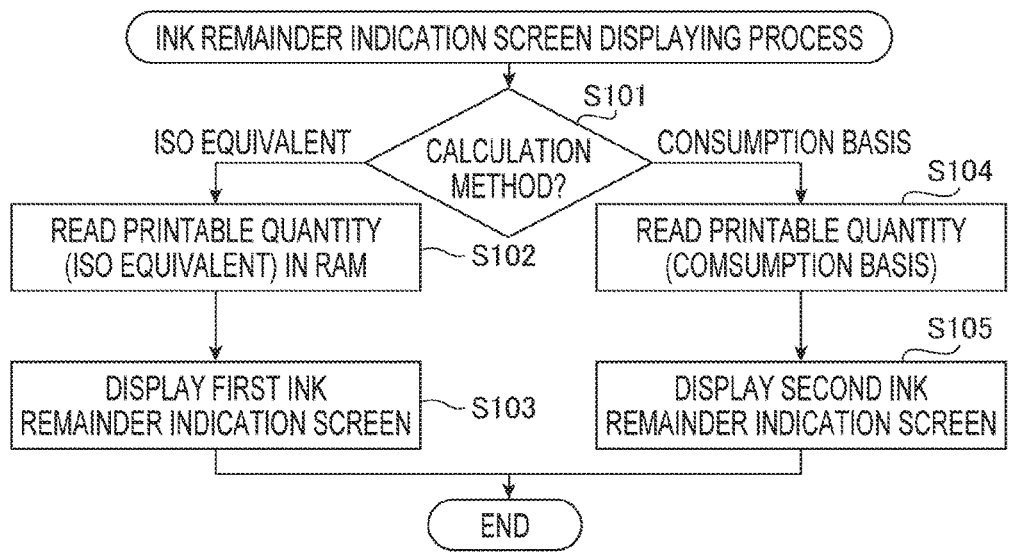

FIG. 12 is a flowchart to illustrate a flow of steps in an ink remainder indication screen displaying process according to the embodiment of the present disclosure.

Figure 13:
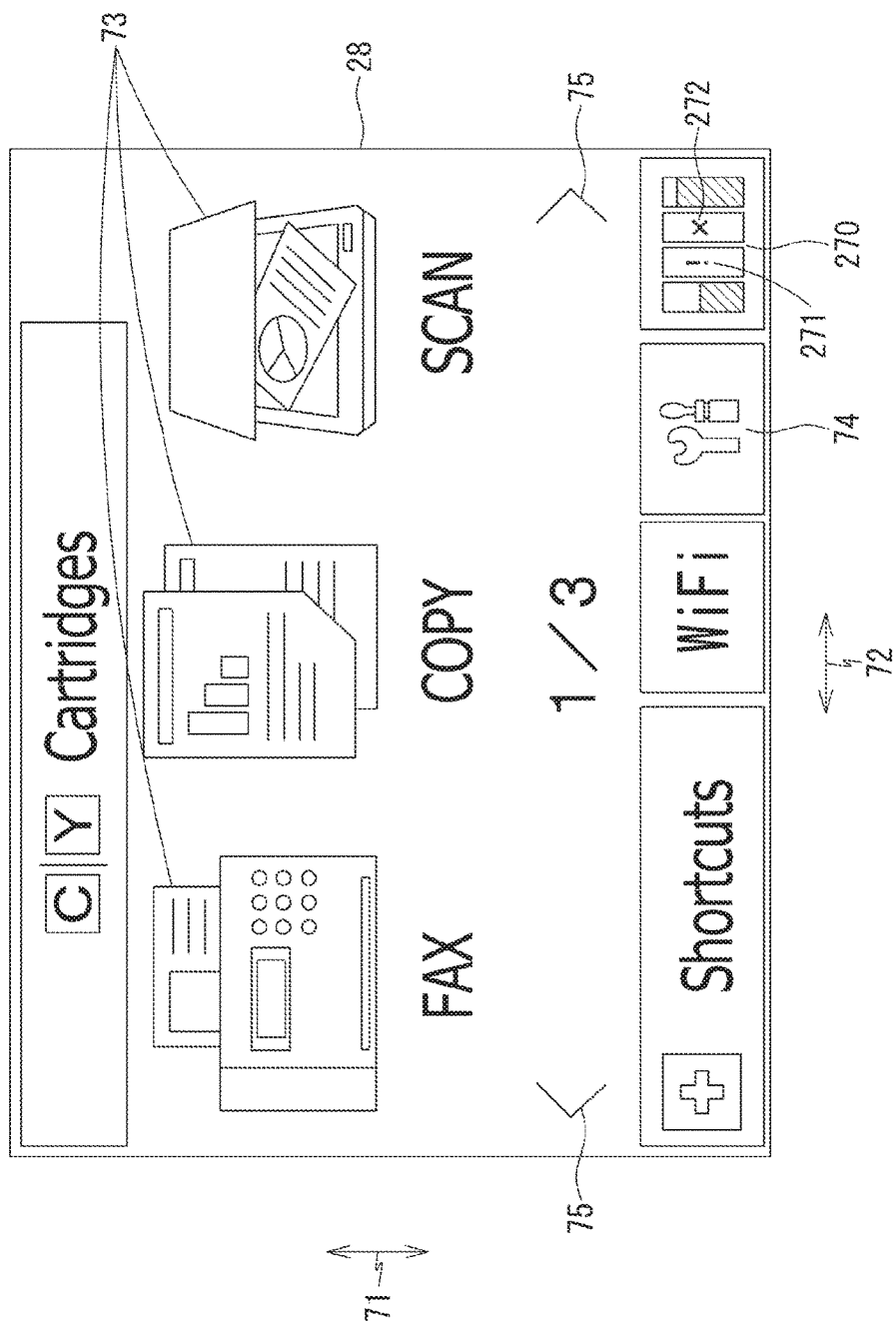

FIG. 13 is an illustrative view of a standby screen to be displayed in a display 28 in the printer 10 according to the embodiment of the present disclosure.

Figure 14A:
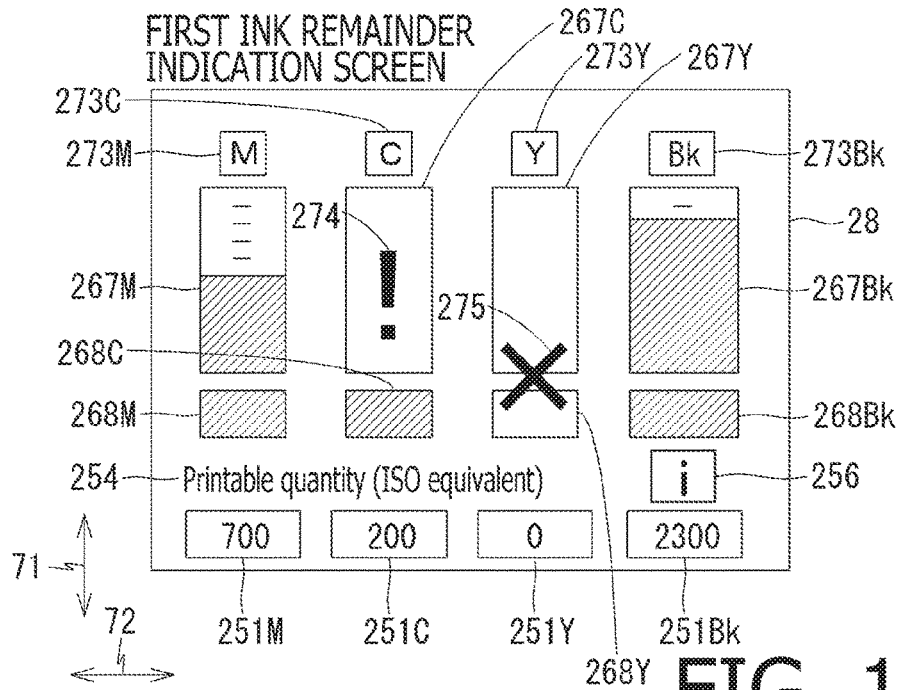
Figure 14B:
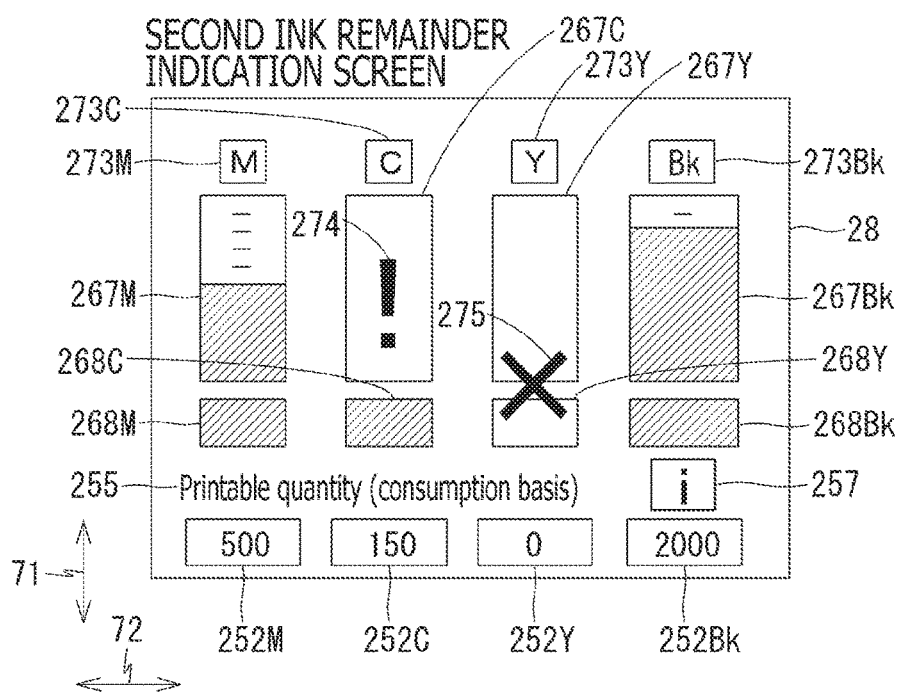

FIG. 14A is an illustrative view of a first ink remainder indication screen to be displayed in the display 28 in the printer 10 according to the embodiment of the present disclosure. FIG. 14B is an illustrative view of a second ink remainder indication screen to be displayed in the display 28 in the printer 10 according to the embodiment of the present disclosure.

Figure 15A:
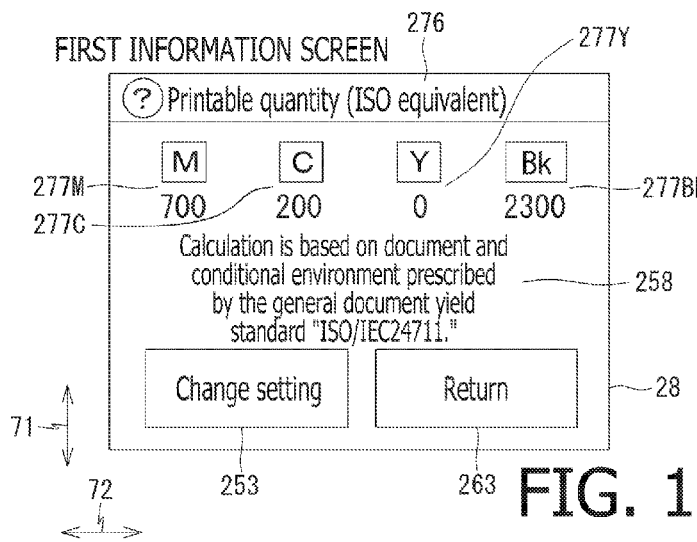
Figure 15B:
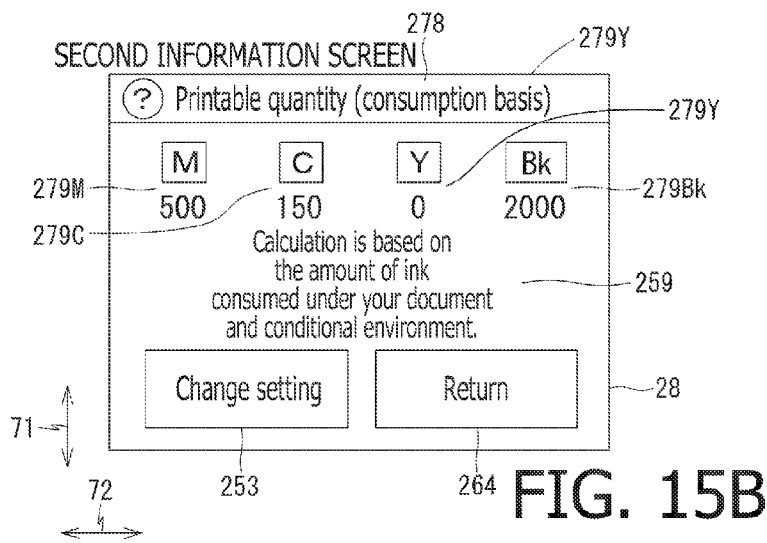

FIG. 15A is a first information screen to be displayed in the display 28 in the printer 10 according to the embodiment of the present disclosure. FIG. 15B is a second information screen to be displayed in the display 28 in the printer 10 according to the embodiment of the present disclosure.

Figure 16A:
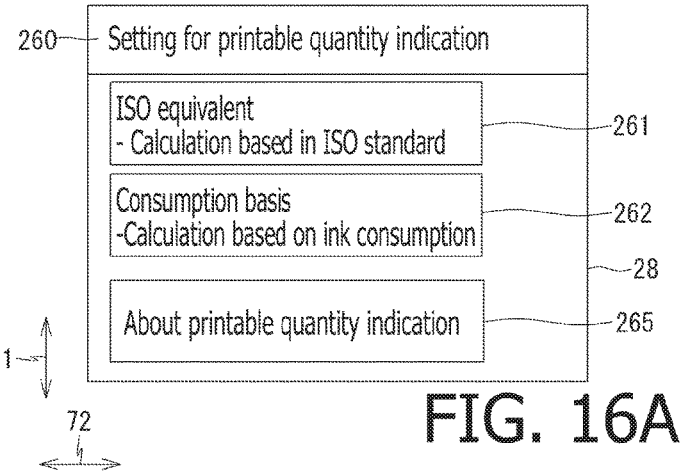
Figure 16B:
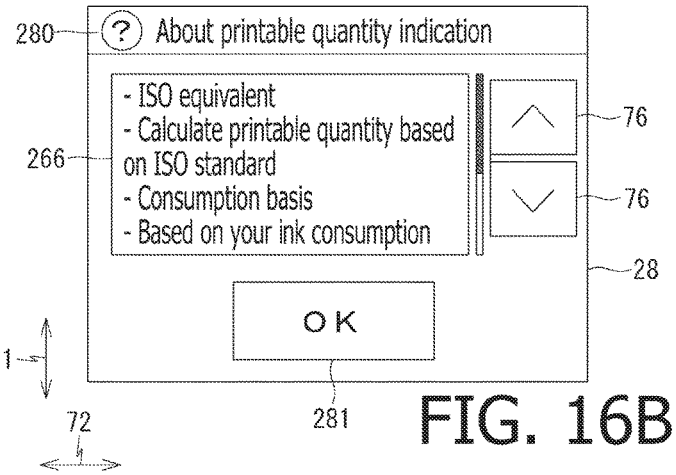

FIG. 16A is a change setting screen to be displayed in the display 28 in the printer 10 according to the embodiment of the present disclosure. FIG. 16B is a detailed information screen to be displayed in the display 28 in the printer 10 according to the embodiment of the present disclosure.

DETAILED DESCRIPTION

Hereinafter, exemplary embodiments according to the present disclosure will be described in detail with reference to the accompanying drawings. It is noted that various connections may be set forth between elements in the following description. These connections in general and, unless specified otherwise, may be direct or indirect and that this specification is not intended to be limiting in this respect. For example, an order to process steps in a flowchart described below may not necessarily be fixed but may be altered within a scope of the present invention.

In the following description, positional relation within a printer 10 and each part or item included in the printer 10 will be mentioned on basis of a user's position to use the printer 10 placed on a horizontal surface, as indicated by the bi-directionally pointing arrows in some of the drawings. For example, in FIG. 1A, a vertical axis between an upper side and a lower side in the drawing may be defined as a vertical direction 7. While a side, on which an opening 13 is arranged, is defined as a front side to the user, a horizontal axis between the front side and a rear side opposite from the front side may be defined as a front-rear direction 8. Further, a horizontal axis between a right-hand side and a left-hand side to the user when the user faces toward the front side of the printer 10 may be defined as a widthwise direction 9. The vertical direction 7, the front-rear direction 8, and the widthwise direction 9 intersect orthogonally to one another.

[Overall Configuration of the Printer 10]

The printer 10 may form images on sheets in an inkjet recording technique. The printer 10 has a body 14, which is in an approximate shape of a rectangular box. The printer 10 may not necessarily be a single-functioned printer but may be a multifunction device having other functions such as a facsimile transmission function, a scanning function, and a copying function.

On a front side of the body 14, arranged is a display 28, which will be described further below.

Figure 1A:
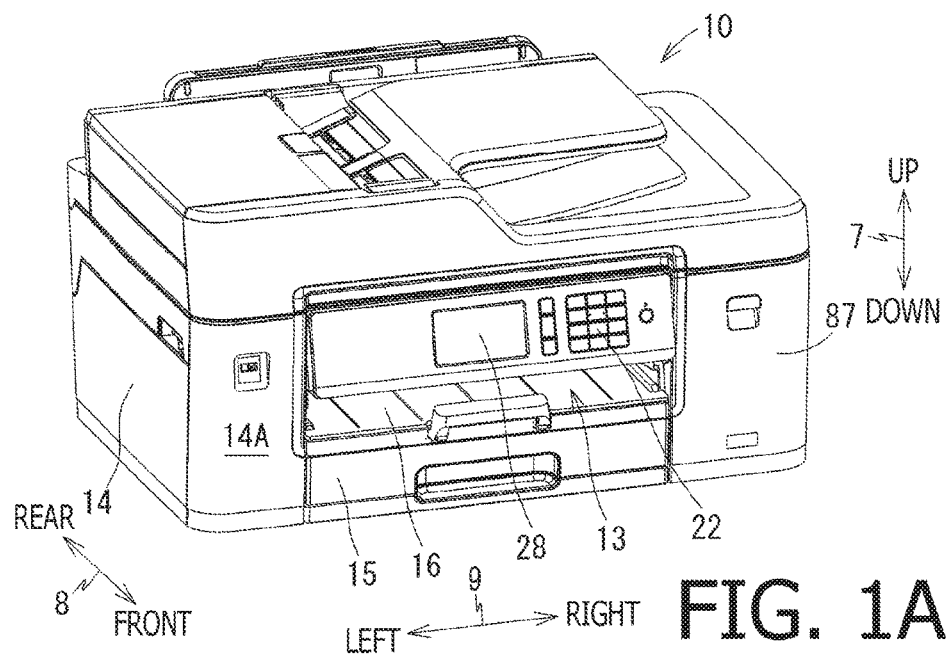
Figure 1B:
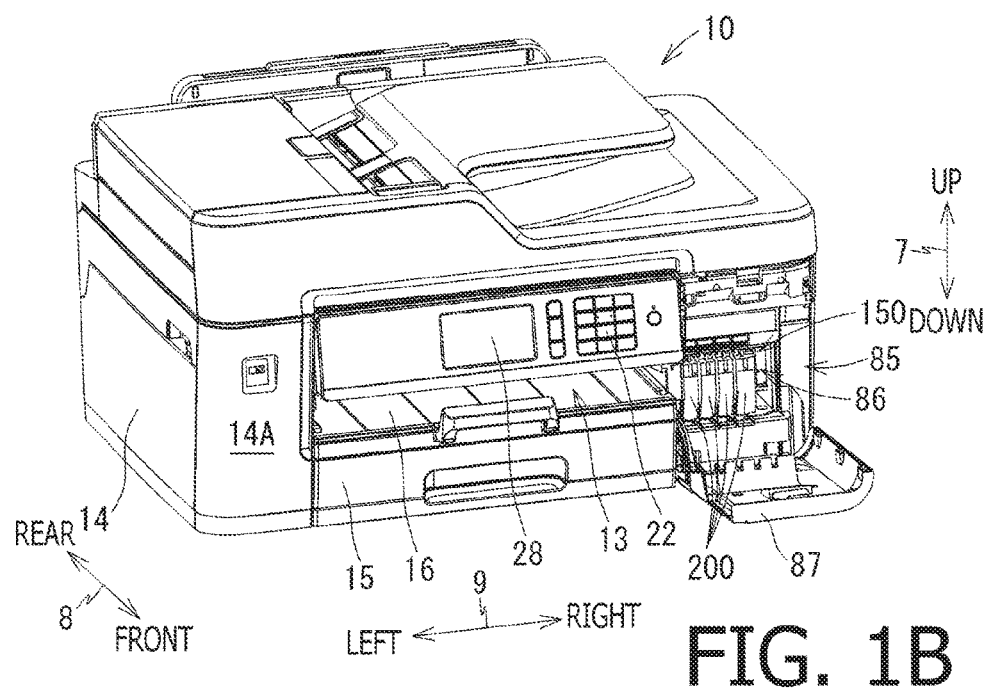
Figure 2:
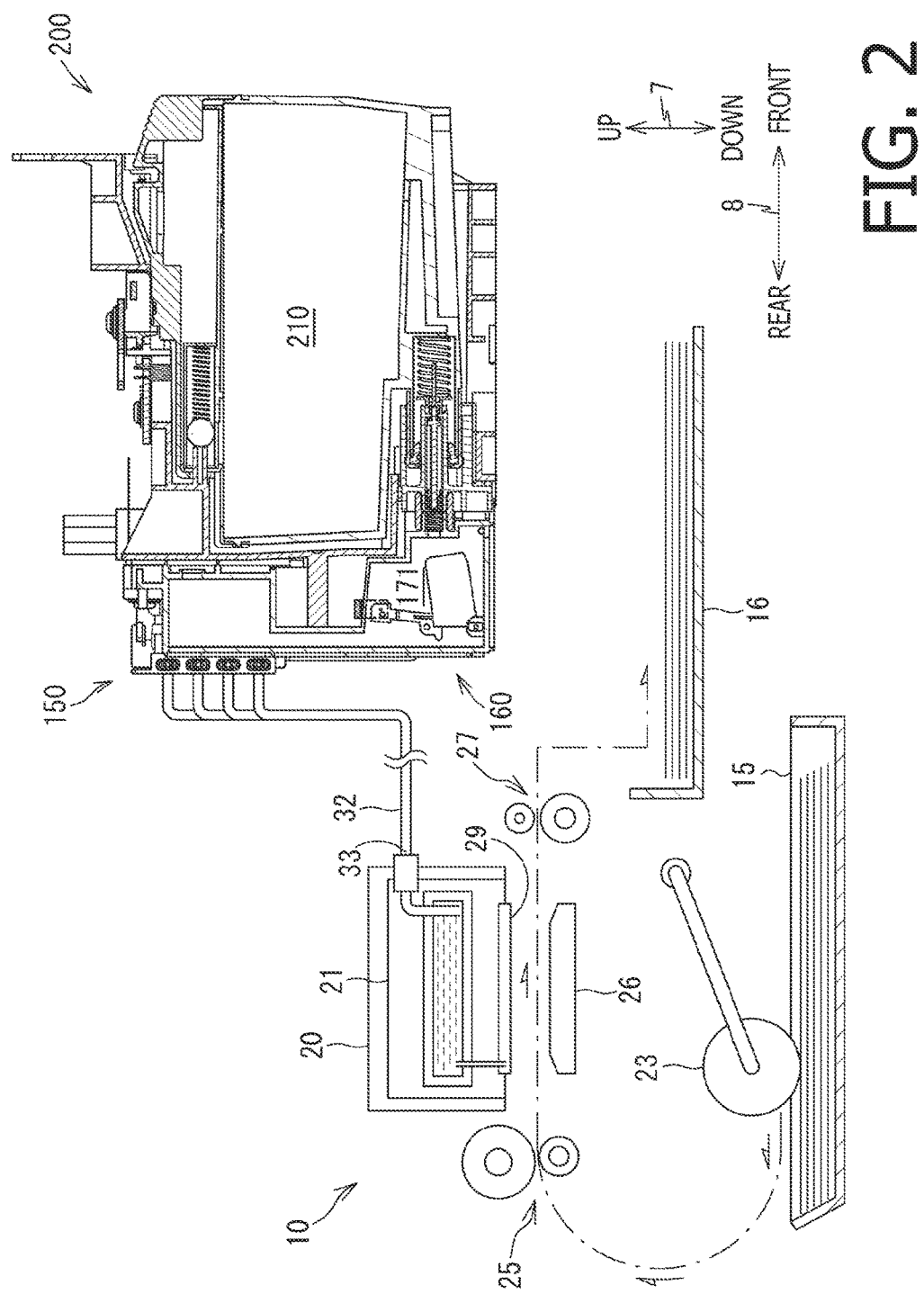
FIG. 2 is an illustrative cross-sectional view of the printer 10 according to the embodiment of the present disclosure.

In the body 14, as shown in FIGS. 1A-1B and 2, arranged are a feeder tray 15, a feed roller 23, a conveyer roller 25, a head 21 with a plurality of nozzles 29, a platen 26 arranged to face toward the head 21, an ejection roller 27, an ejection tray 16, an attachment case 150, and a tube 32. To the attachment case 150, a cartridge 200 may be detachably attached. The cartridge 200 attached to the attachment case 150 is connected with the head 21 through the tube 32.

The printer 10 may drive the feed roller 23 and the conveyer roller 25 to rotate and convey a sheet loaded in the feeder tray 15 to a position of the platen 26. The printer 10 controls the head 21 to discharge ink, which may be supplied from the cartridge 200 attached to the attachment case 32 through the tube 32, from the nozzles 29. Thus, the ink discharged from the nozzles 26 may land on the sheet and record an image on the sheet. The printer 10 may drive the ejection roller 27 to eject the sheet with the image formed thereon at the ejection tray 16.

The head 21 is mounted on a carriage 20, which reciprocates in a main scanning direction. The main scanning direction extends in a direction of depth in FIG. 2 and intersects with a conveying direction, in which the sheet may be conveyed by the conveyer roller 25. The carriage 20 may be moved in the main scanning direction by a driving force from a motor (not shown). The printer 10 may control the conveyer roller 25 to pause and control the carriage 20 to move in the main scanning direction and the head 21 to discharge the ink from the nozzles 29. Thereby, a row of image may be recorded in a linear path on the sheet that faces with the head 21 while the head 21 moves in the main scanning direction. The linear path faces with the head 21 while the head 21 moves in the main scanning direction. The printer 10 may further control the conveyer roller 25 to convey the sheet for a predetermined amount so that a next linear path in the sheet may face with the head 21 and another row of image may be recorded in the next linear path. Operations of recording a row of image and conveying the sheet for a next linear path may be repeated alternately for a plurality of times to form an image on the sheet.

[Cover 87]

As shown in FIGS. 1A-1B, on a front face 14A of the body 14, at a rightward area, formed is an opening 85. The body 14 has a cover 87. The cover 87 is pivotable between a covering position, in which the opening 85 is closed (see FIG. 1A), and an exposing position, in which the opening 85 is exposed (see FIG. 1B). The cover 87 may be pivotably supported by, for example, a lower edge of the body 14, to pivot about a pivot axis, which extends in the widthwise direction 9. Inside the body 14, in an attachment cavity 86, which continues from the opening 85 in the front-rear direction, arranged is the attachment case 150.

[Attachment Case 150]

The attachment case 150 as shown in FIG. 3 includes a contact 152, a rod 153, an attachment sensor 154, a liquid-level sensor 155, and a locking pin 156. The attachment case 150 may accommodate a plurality of, e.g., four (4), cartridges 200 each containing ink in a different color, which may be, for example, black, cyan, magenta, and yellow. In this regard, the attachment case 150 has a set of the contact 152, the rod 153, the attachment sensor 154, and the liquid-level sensor 155, for each of the four cartridges 200. In the following paragraphs, the terms "the contact 152," "the rod 153," "the attachment sensor 154," and "the liquid-level sensor 155" may mean four (4) contacts 152, four (4) rods 153, four (4) attachment sensors 154, and four (4) liquid-level sensors 155, for the cartridges 200 for black, cyan, magenta, and yellow, respectively. Meanwhile, a quantity of the cartridges 200 to be mounted in the attachment case 150 may not necessarily be limited to four but may be less than four, e.g., one, or more than four. In the following paragraphs, among the four identical items, e.g., the contacts 152, the rods 153, the attachment sensors 154, and the liquid-level sensors 155, solely one of them may be described as a representative.

The attachment case 150 has a shape of a box having an inner cavity to accommodate the cartridges 200. The inner cavity in the attachment case 150 is limited by a ceiling, a bottom, a rear wall, and a pair of side walls, which define an upper end, a lower end, a rear end in the front-rear direction 8, and widthwise ends in the widthwise direction 9, respectively. A frontward part of the attachment case 150 across from the rear wall in the front-rear direction 8 forms the opening 85 in the body 14. When the cover 87 is at the exposing position, the inner cavity in the attachment case 150 may be exposed outward through the opening 85.

The cartridges 200 may be attached to and removed from the attachment case 150 through the opening 85 in the body 14. In particular, each cartridge 200 may be pushed rearward through the opening 85 to be attached to the attachment case 150 and may be pulled frontward through the opening 85 to be removed from the attachment case 150.

[Contacts 152]

The contacts 152 are arranged on the ceiling of the attachment case 150 and protrude downward in the inner cavity from the ceiling. Each contact 152 is located at a position, where the contact 152 may contact electrodes 248 (see FIG. 4A) on the cartridge 200, which will be described further below, when the cartridge 200 is attached to the attachment case 150. The contact 152 is electrically conductive and resiliently deformable in the vertical direction 7. The contact 152 is electrically connected with the controller 130.

[Rods 153]

The rods 153 (see FIG. 3) protrude frontward from the rear wall of the attachment case 150. Each rod 153 is located at a position higher than a joint 180, which will be described further below, on the rear wall of the attachment case 150. The rod 153 may enter an air valve compartment 214 (see FIG. 4B) in the cartridge 200 through an air communication hole 221 (see FIGS. 4A-4B), which will be described further below, while the cartridge 200 is in transition to be attached to the attachment case 150. The rod 153 in the air valve compartment 214 allows the air valve compartment to be in fluid communication with the atmosphere.

[Attachment Sensors 154]

The attachment sensors 154 (see FIG. 3) are arranged on the ceiling of the attachment case 150. Each attachment sensor 154 may detect a condition of a corresponding one of the cartridges 200, i.e., whether the cartridge 200 is attached to the attachment case 150 or not. The attachment sensor 154 may include a light emitter and a light receiver, which are not shown but may be spaced apart from each other in the widthwise direction 9. When the cartridge 200 is attached to the attachment case 150, a light-blocking rib 245 (see FIGS. 4A-4B) on the cartridge 200 is located between the light emitter and the light receiver in the attachment sensor 154. In other words, the light emitter and the light receiver in the attachment sensor 154 are arranged to face each other across the light-blocking rib 245 on the cartridge 200 when the cartridge 200 is attached to the attachment case 150.

The attachment sensor 154 outputs different signals depending on light-receiving conditions of the light receiver, i.e., whether or not the light receiver receives the light emitted in the widthwise direction 9 from the light emitter. The signals output from the light receiver indicating the light-receiving condition of the light receiver in the attachment sensor 154 will be called as an attachment signal. The attachment sensor 154 may output a lower-leveled signal to the controller 130 in response to, for example, an intensity of the light received in the light receiver being less than a threshold intensity. On the other hand, the attachment sensor 154 may output a higher-leveled signal to the controller 130 in response to the intensity of the light received in the light receiver being greater than or equal to the threshold intensity.

[Liquid-Level Sensors 155]

Each of the liquid-level sensors 155 may detect a position of a detectable part 194 (see FIG. 5) in an actuator 190, which will be described further below. In particular, the liquid-level sensor 155 may detect whether or not the detectable part 194 is at a detectable position. The liquid-level sensor 155 includes a light emitter and a light receiver, which are not shown but may be spaced apart from each other in the widthwise direction 9. In other words, the light emitter and the light receiver in the liquid-level sensor 155 are arranged to face each other across the detectable part 194 when the detectable part 194 is at the detectable position. The liquid-level sensor 155 may output different signals depending on light-receiving conditions of the light receiver, i.e., whether or not the light receiver receives the light emitted from the light emitter. The signals output from the light receiver indicating the light-receiving condition of the light receiver in the liquid-level sensor 155 will be called as a liquid-level signal.

[Locking Pins 156]

The locking pin 156 is located at an upper end in the inner cavity of the attachment case 150 in proximity to the opening 85 and has a shape of a rod longitudinally extending in the widthwise direction 9. The locking pin 156 is fixed to the sideward walls of the attachment case 150 at widthwise ends thereof. The locking pin 156 extends in the widthwise direction 9 crossing through the inner cavity that may accommodate the four cartridges 200. The locking ping 56 may hold the cartridges 200 attached to the attachment case 150 at the position shown in FIG. 5. The cartridges 200 attached to the attachment case 150 may engage with the locking pin 156.

[Tanks 160]

The printer 10 has four (4) tanks 160 for the four (4) cartridges 200. In particular, the printer 10 has four (4) reservoir sets of tanks 160 and cartridges 200: a tank 160 to store the magenta ink, which corresponds to a cartridge 200 to store the magenta ink; a tank 160 to store the cyan ink, which corresponds to a cartridge 200 to store the cyan ink; a tank 160 to store the yellow ink corresponding to a cartridge 200 to store the yellow ink; and a tank 160 to store the black ink, which corresponds to a cartridge 200 to store the black ink.

The tanks 160 are located at positions rearward with respect to the rear wall of the attachment case 150. Each tank 160 has, as shown in FIG. 3, an upper wall 161, a front wall 162, a lower wall 163, a rear wall 164, and a pair of sidewalls which are not shown. The front wall 162 may include a plurality of walls that are in different positions from one another in the front-rear direction 8. Inside the tank 160, formed is a liquid compartment 171.

Among the walls that form the tank 160, at least a part that faces the liquid-level sensor 155 is translucent. Therefore, the light emitted from the liquid-level sensor 155 may be transmitted through the wall that faces the liquid-level sensor 155. The rear wall 164 may include, at least partly, a sheet of film fused to edges of the upper wall 161, the lower wall 163, and the sidewalls. Meanwhile, the sidewalls of the tank 160 may be unified with the attachment case 150 or may be independent from the attachment case 150. The tanks 160 adjoining along the widthwise direction 9 are divided by bulkheads, which are not shown. The tanks 160 may be in similar or identical configuration to one another.

The liquid compartment 171 is continuous with an ink channel, which is not shown, through a liquid outlet 174. A lower end of the liquid outlet 174 is defined by the lower wall 163, which defines the lower end of the liquid compartment 171. The liquid outlet 174 is located to be lower than the joint 180, and in particular, a lower end of a through hole 184. The ink channel continuous with the liquid outlet 174 is continued to the tube 32. Therefore, the liquid compartment 171 is continuous with the head 21 through the liquid outlet 174, the ink channel, and the tube 32. In other words, the ink stored in the liquid compartment 171 may be supplied to the head 21 through the liquid outlet 174, the ink channel, and the tube 32. The ink channel and the tube 32, which are continuous with the liquid outlet 174, are continued to the liquid compartment 171 at one end, i.e., the liquid outlet 174, and to the head 21 at the other end 33 (see FIG. 2).

The liquid compartment 171 is in fluid communication with the atmosphere through the air communication compartment 175. In particular, the air communication compartment 175 is continuous with the liquid compartment 171 though a through hole 176, which is formed through the front wall 162 of the tank 160. Moreover, the air communication compartment 175 is continuous with the atmosphere outside the printer 10 through an air communication port 177 and a tube, which is now shown but is connected with the air communication port 177. In other words, the air communication compartment 175 is in fluid communication with the liquid compartment 171 at one end, i.e., at the through hole 176, and to the atmosphere outside the printer 10 at the other end, i.e., at the air communication port 177. Meanwhile, the air communication compartment 175 is continuous with the atmosphere through the air communication port 177 and the tube which is not shown.

[Joints 180]

The joint 180 includes, as shown in FIG. 3, a needle 181 and a guide 182. The needle 181 is tubular and has an inner cavity serving as a fluid channel therein. The needle 181 protrudes frontward from the front wall 162, which defines the front end of the liquid compartment 171. The needle 181 is formed to have an opening 183 at a protruded end thereof. The fluid channel inside the needle 181 is continuous with the liquid compartment 171 through the through hole 184 formed in the front wall 162. The needle 181 is in fluid communication with the atmosphere outside the tank 160 at one end, i.e., through the opening 183, and with the liquid compartment 171 at the other end, i.e., through the through hole 184. The guide 182 is in a cylindrical shape arranged around the needle 181. The guide 182 protrudes frontward from the front wall 162 and is open frontward at the protruded end thereof.

In the inner cavity inside the needle 181, arranged are a valve 185 and a coil spring 186. The valve 185 is movable in the inner cavity inside the needle 181 between a closed position and an open position along the front-rear direction 8. The valve 185 at the closed position closes the opening 183 and at the open position opens the opening 183. The coil spring 186 urges the valve 185 in a direction to move from the open position toward the closing position, i.e., frontward, in the front-rear direction 8.

[Actuator 190]

In the liquid compartment 171, arranged is an actuator 190. The actuator 190 is pivotably supported by a supporting member, which is not shown but is arranged in the liquid compartment 171, to pivot in directions indicated by counterclockwise and clockwise arrows 198, 199 (see FIG. 3). The actuator 190 may pivot between positions indicated by solid lines and broken lines in FIG. 3. Meanwhile, the actuator 190 is restricted by a stopper, which is not shown, e.g., an inner wall in the liquid compartment 171, from pivoting in the direction indicated by the counterclockwise arrow 198. The actuator 190 includes a float 191, a shaft 192, an arm 193, and the detectable part 194.

The float 191 is made of a material, of which specific gravity is smaller than the ink to be stored in the liquid compartment 171. The shaft 192 protrudes in the widthwise direction 9 from a rightward face and a leftward face of the float 191. The shaft 192 is inserted in a hole, which is not shown but is formed in the supporting member for the actuator 190. Thereby, the actuator 190 is pivotably supported by the supporting member to pivot about the shaft 192. The arm 193 extends upward from the float 191. The detectable part 194 is arranged at a protruded end of the arm 193. The detectable part 194 may be a piece of plate spreading in the vertical direction 7 and the front-rear direction 8. The detectable part 194 is either made of a material or in a color that blocks the light emitted from the light emitter of the liquid-level sensor 155.

When a level of the ink in the liquid compartment 171 is higher than or equal to a threshold position P, the actuator 190, pivoted in the direction of the counterclockwise arrow 198 by its buoyancy, is held by the stopper at a detectable position indicated by the solid lines in FIG. 3. On the other hand, when the level of the ink in the liquid compartment 171 descends to be lower than the threshold position P, the actuator 190 pivots in the direction of the clockwise arrow 199. Therefore, the detectable part 194 moves to a position displaced from the detectable position. In other words, the detectable part 194 moves to a position corresponding to an amount of the ink remaining in the liquid compartment 171.

The threshold position P may be at a same height as an axial center of the needle 181 in the vertical direction 7 and at a same height as a center of an ink supplier port 234, which will be described further below. However, the threshold position P is not necessarily limited as long as the threshold position P is higher than the liquid outlet 174. For example, the threshold position P may be at a same height as an upper end or a lower end of the inner cavity in the needle 181 or may be at a same height as an upper end or a lower end of the ink supplier port 234.

When the level of the ink in the liquid compartment 171 is higher than or equal to the threshold position P, the light emitted from the light emitter in the liquid-level sensor 155 is blocked by the detectable part 194. Therefore, the light from the light emitter may not reach the light receiver, and the liquid-level sensor 155 may output a lower-leveled (L) signal to the controller 130. On the other hand, when the level of the ink in the liquid compartment 171 is lower than the threshold position P, the light emitted from the light emitter may reach the light receiver; therefore, the liquid-level sensor 155 may output a higher-leveled (H) signal to the controller 130. In other words, when the signal from the liquid-level sensor 155 is the lower-leveled signal, the level of the ink in the liquid compartment 171 is higher than or equal to the threshold position P. On the other hand, when the signal from the liquid-level sensor 155 is the higher-leveled signal, the level of the ink in the liquid compartment 171 is lower than the threshold position P. Thus, the controller 130 may detect the level of the ink in the liquid compartment 171, whether the level of the ink is higher than or equal to or lower than the threshold position P, based on the signal output from the liquid-level sensor 155.

[Cartridges 200]

Figure 4A:
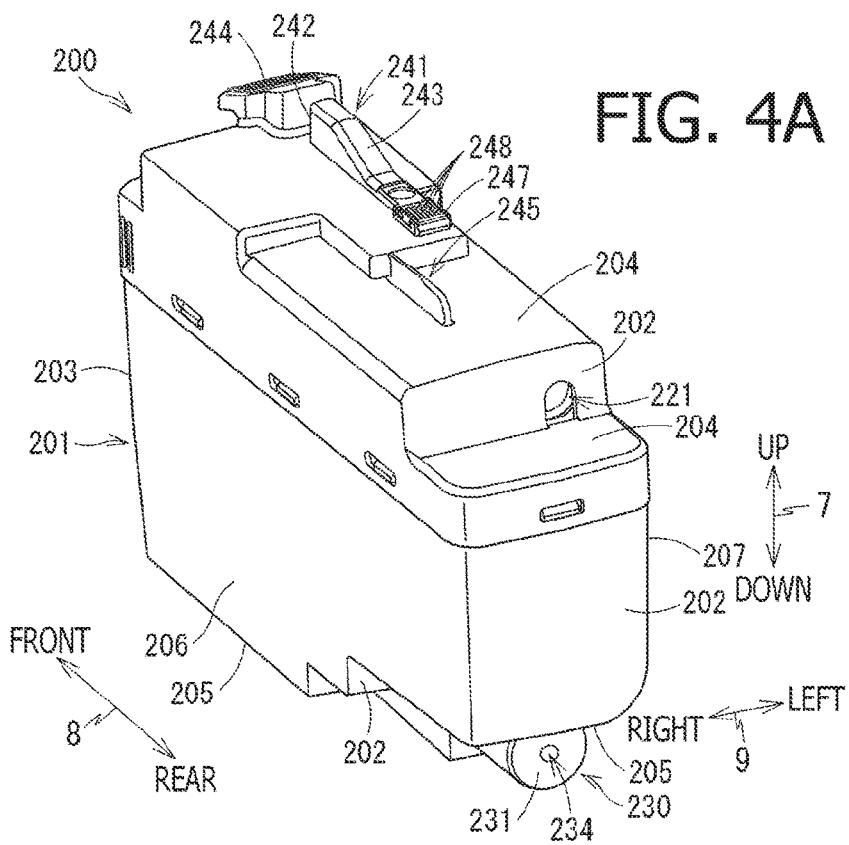
FIGS. 4A and 4B are a perspective view and a cross-sectional view of a cartridge 200 for the printer 10 according to the embodiment of the present disclosure.

The cartridges 200 are reservoirs, each having the liquid compartment 210 (see FIG. 2) to store a colorant, e.g., the ink. The liquid compartment 210 is defined by walls that may be made of, for example, resin. The cartridge 200 may be in a shape thinner in the widthwise direction 9, and of which dimensions in the vertical direction 7 and the front-rear direction 8 are greater than a dimension in the widthwise direction 9, as shown in FIG. 4A. The cartridges 200 to store inks in different colors may be either in a same shape or in different shapes. At least a part of the walls that form each cartridge 200 is translucent. Therefore, the user may visually recognize the level of the ink stored in the liquid compartment 210 from the outside through the translucent part.

Each cartridge 200 has a body 201 and a supplier tube 230. The body 201 includes a rear wall 202, a front wall 203, an upper wall 204, a lower wall 205, and a pair of sidewalls 206, 207. The rear wall 202 may include a plurality of walls that are in different positions from one another in the front-rear direction 8. The upper wall 204 may include a plurality of walls that are in different positions from one another in the vertical direction 7. The lower wall 205 may include a plurality of walls that are in different positions from one another in the vertical direction 7.

Figure 4B:
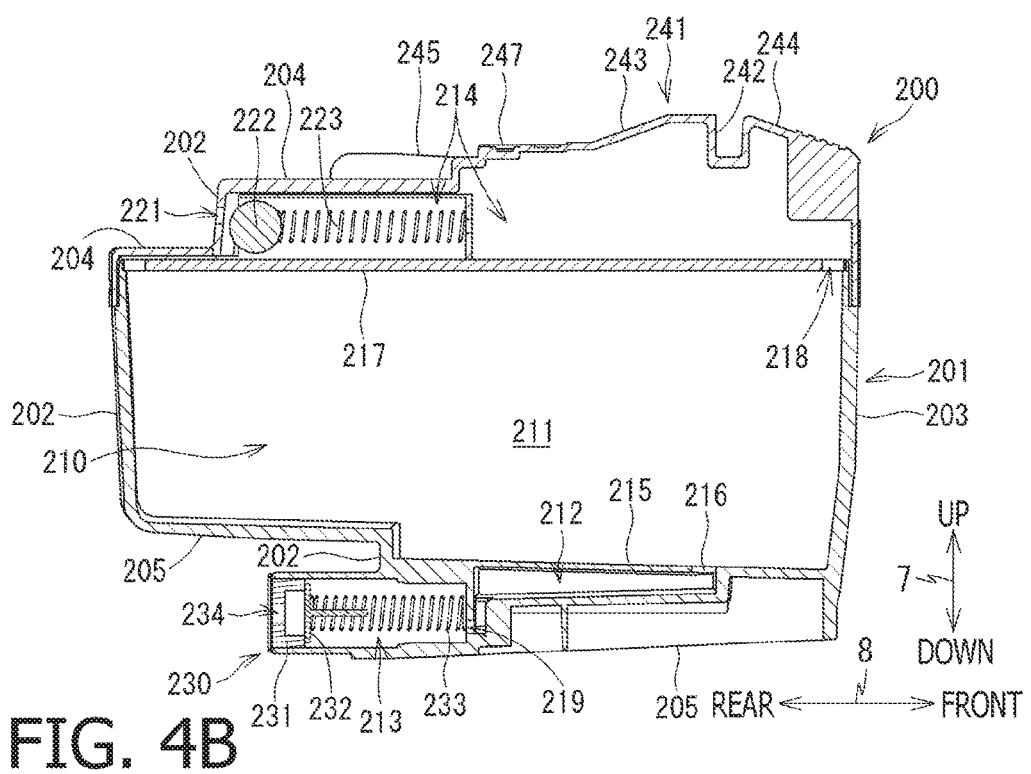

Inside each cartridge 200, as shown in FIG. 4B, formed are the liquid compartment 210, an ink valve compartment 213, and the air valve compartment 214. The liquid compartment 210 includes an upper liquid compartment 211 and a lower liquid compartment 212. The upper liquid compartment 211, the lower liquid compartment 212, and the air valve compartment 214 form the inner cavity in the body 201. Meanwhile, the ink valve compartment 213 forms an inner cavity in the supplier tube 230. The liquid compartment 210 may store the ink therein. The air valve compartment 214 connects the liquid compartment 210 to be in fluid communication with the atmosphere outside the cartridge 200.

The upper liquid compartment 211 and the lower liquid compartment 212 are separated from each other in the vertical direction 7 by a bulkhead 215 that divides the inner cavity in the body 201. Meanwhile, the upper liquid compartment 211 and the lower liquid compartment 212 are in fluid communication with each other through a through hole 216, which is formed through the bulkhead 215. The upper liquid compartment 211 and the air valve compartment 214 are separated from each other in the vertical direction 7 by a bulkhead 217 that divides the inner cavity in the body 201. Meanwhile, the upper liquid compartment 211 and the air valve compartment 214 are in fluid communication with each other through a through hole 218, which is formed through the bulkhead 217. The ink valve compartment 213 is in fluid communication with a lower end of the lower liquid compartment 212 through a through hole 219.

The air valve compartment 214 is continuous with the atmosphere outside the cartridge 200 through an air communication port 221, which is formed in the rear wall 202, at an upper position in the cartridge 200. Therefore, the air valve compartment 214 is in fluid communication with the liquid compartment 210, more specifically, to the upper liquid compartment 211, at one end, i.e., at the through hole 218, and with the atmosphere outside the cartridge 200 at the other end, i.e., at the air communication port 221. The air valve compartment 214 is in fluid communication with the atmosphere through the air communication port 221. Meanwhile, in the air valve compartment 214, arranged are a valve 222 and a coil spring 223. The valve 222 is movable in the air valve compartment 214 between a closed position and an open position along the front-rear direction 8. The valve 222 at the closed position closes the air communication port 221 and at the open position opens the air communication port 221. The coil spring 223 may urge the valve 222 in a direction to move from the open position toward the closed position, i.e., rearward, in the front-rear direction 8.

As the cartridge 200 moves to be attached to the attachment case 150, the rod 153 may enter the air valve compartment 214 through the air communication port 221. The rod 153 entering the air valve compartment 214 may move the valve 222 frontward from the closed position against the urging force of the coil spring 223. When the valve 222 reaches the open position, the upper liquid compartment 11 becomes in fluid communication with the atmosphere. Meanwhile, the structure to open the air communication port 221 may not necessarily limited to those described above. For example, the rod 153 may push and tear a film that seals the air communication port 221 open.

The supplier tube 230 protrudes rearward from the rear wall 202 at a lower position in the body 201. The supplier tube 230 is open rearward at a protrusive end, i.e., a rear end, thereof. In this regard, the ink valve compartment 213 connects the liquid compartment 210, which is continuous with the ink valve compartment 213 through the through hole 219, with the atmosphere outside the cartridge 200. Thus, the ink valve compartment 213 is in fluid communication with the liquid compartment 210, more specifically, to the lower liquid compartment 212, at one end, i.e., at the through hole 219, and to the atmosphere outside the cartridge 200 at the other end, i.e., at an ink supplier compartment 234, which will be described further below. In the ink valve compartment 213, arranged are a packing 231, a valve 232, and a coil spring 233.

At a center in the packing 231, formed through in the front-rear direction 8 is the ink supplier port 234. An inner diameter of the ink supplier port 234 is substantially smaller than an outer diameter of the needle 181. The valve 232 may move between the closed position and the open position along the front-rear direction 8. The valve 232 at the closed position contacts the packing 231 and closes the ink supplier port 234. The valve 232 at the open position is separated from the packing 231 and opens the ink supplier port 234. The coil spring 233 may urge the valve 232 in a direction to move from the open position toward the closed position, i.e., rearward, in the front-rear direction 8. The urging force of the coil spring 233 is greater than the urging force of the coil spring 186.

As the cartridge 200 moves to be attached to the attachment case 150, the supplier tube 230 may enter the guide 182, and the needle 181 may enter the ink valve compartment 213 through the ink supplier port 234. The needle 181 entering the ink valve compartment 213 may resiliently deform the packing 231 and liquid-tightly fit in an inner peripheral surface of the ink supplier port 234. As the cartridge 200 is pushed further in the attachment case 150, the needle 181 may move the valve 232 frontward against the urging force of the coil spring 233. Meanwhile, the valve 232 may move the valve 185 protruding through the opening 183 rearward against the urging force of the coil spring 186.

As the valve 185 moves rearward, the ink supplier port 234 and the opening 183 are connected, and the ink valve compartment 213 in the supplier tube 230 and the inner cavity in the needle 181 are connected with each other, as shown in FIG. 5. In other words, under the condition where the cartridge 200 is attached to the attachment case 150, the ink valve compartment 213 and the inner cavity in the needle 181 form a channel, which connects the liquid compartment 210 in the cartridge 200 with the liquid compartment 171 in the tank 160.

Moreover, under the condition where the cartridge 200 is attached to the attachment case 150, as shown in FIG. 5, a part of the liquid compartment 210 and a part of the liquid compartment 171 overlap each other in a view along a horizontal direction. Therefore, the ink stored in the liquid compartment 210 may flow in the liquid compartment 171 in the tank 160 through the supplier tube 230 and the joint 180 that are connected with each other by an effect of a hydraulic difference.

On the upper wall 204 of the cartridge 200, formed is a protrusion 241. The protrusion 241 protrudes upward from an upward surface of the upper wall 204 and longitudinally extends in the front-rear direction 8. The protrusion 241 includes a locking surface 242 and a slope surface 243, which are located to be higher than the upper wall 204. The locking surface 242 faces frontward and spreads in the vertical direction 7 and the widthwise direction 9. In this regard, the locking surface 242 may spread substantially orthogonally to the upper wall 204. The slope surface 243 inclines with respect to the upper wall 204 to face upper-rearward.

The locking surface 242 may, under the condition where the cartridge 200 is attached to the attachment case 150, contact the locking pin 156. The slope surface 243 may, as the cartridge 200 moves to be attached to the attachment case 150, guide the locking pin 156 to a position where the locking pin 156 contacts the locking surface 242. While the locking surface 242 and the locking pin 156 are maintained in contact with each other, the cartridge 200 is maintained at an attachment position, as shown in FIG. 5, against the urging forces of the coil springs 186, 223, 233.

On the upward surface of the upper wall 204, at a frontward position with respect to the locking surface 242, arranged is a plate member, which extends upward from the upper wall 204. An upper surface of the plate member serves as an operative part 244, which may be operated by a user when the cartridge 200 is removed from the attachment case 150. Under the condition where the cartridge 200 is attached to the attachment case 150, and when the cover 87 is at the exposing position, the operative part 244 is accessible to the user. When the user pushes the operative part 244 downward, a front part of the cartridge 200 may pivot downward, and the locking surface 242 may move downward to be lower than the locking pin 156. Therefore, the cartridge 200 may be released from the attachment case 150.

On the upward surface of the upper wall 204, at a rearward position with respect to the protrusion 241, formed is a light-blocking rib 245. The light-blocking rib 245 protrudes upward from the upper face of the upper wall 204 and longitudinally extends in the front-rear direction 8. The light-blocking rib 245 is either made of a material or in a color that blocks the light emitted from the light emitter of the attachment sensor 154. The light-blocking rib 245 is, under the condition where the cartridge 200 is attached to the attachment case 150, located on a light path between the light emitter and the light receiver in the attachment sensor 154. Therefore, the attachment sensor 154 may output the lower-leveled signal to the controller 130 in response to the condition where the cartridge 200 is attached to the attachment case 150. On the other hand, the attachment sensor 154 may output the higher-leveled signal to the controller 130 in response to a condition where the cartridge 200 is not attached to the attachment case 150. Thus, the controller 130 may detect the condition of the cartridge 200 being attached to the attachment case 150 based on the signal output from the attachment sensor 154.

On the upward surface of the upper wall 204, at a position between the light-blocking rib 245 and the protrusion 241 in the front-rear direction 8, arranged is an IC chip 247, on which the electrodes 248 are mounted. The IC chip 247 includes a memory device, which is not shown, and the electrodes 248 are electrically connected with the memory device. The electrodes 248 on an upper surface of the IC chip 247 are exposed so that the electrodes 248 may be conductive with the contact 152. In this regard, under the condition where the cartridge 200 is attached to the attachment case 150, the electrodes 248 are electrically conducted with the contact 152. The controller 130 may read and write information in the memory device in the IC chip 247 through the contact 152 and the electrodes 248. In the following paragraphs, written description such as "reading information in the IC chip 247" and "writing information in the IC chip 247" may be equated with "reading information in the memory device in the IC chip 247" and "writing information in the memory device in the IC chip 247," respectively.

[Controller 130]

The controller 130 includes, as shown in FIG. 6, a CPU 131, a ROM 132, a RAM 133, an EEPROM 134, and an ASIC 135. The ROM 132 may store controlling program 35, by which the CPU 131 may control behaviors of the printer 10. The RAM 133 may serve as a storage area to store data and signals to be used by the CPU 131 as the CPU 131 executes programs, including the controlling program 35, temporarily, and as a work area for process the data and the information. The EEPROM 134 may store information, such as configuration information concerning the printer 10, which should be saved when the printer 10 is powered on and off.

The ASIC 135 may control behaviors of the feed roller 23, the conveyer roller 25, the ejection roller 27, and the heads 21. The controller 130 may drive a motor, which is not shown, through the ASIC 135 so that the feed roller 23, the conveyer roller 25, and the ejection roller 27 may rotate. Moreover, the controller 130 may output driving signals to drivable elements in the heads 21 through the ASIC 135 so that the heads 21 may discharge the inks through the nozzles 29. The ASIC 135 may output multiple types of driving signals depending on amounts of the inks to be discharged through the nozzles 29.

The ASIC 135 is electrically connected with the contacts 152, the attachment sensors 154, the liquid-level sensors 155, and a communication interface 34. The controller 130 may access the memory devices in the IC chips 247 in the cartridges 200 attached to the attachment case 152 through the contacts 152. The controller 130 may detect attachment or removal of the cartridges 200 to and from the attachment case 150 through the attachment sensors 154. Moreover, the controller 130 may detect the levels of the inks in the liquid compartments 171, i.e., whether the levels of the inks are higher or equal to the threshold position P or not, through the liquid-level sensors 155.

The EEPROM 134 may store information the cartridges 200 to be attached to the attachment case 150. In other words, the EEPROM 134 may store information concerning each cartridge 200, in association with the tank 160 which is connected with the cartridge 200. The information may include a flag called S_Empty flag, an initial first remainder value for each of the cartridges 200, and an initial second remainder value for each of the tanks 160, which will be described further below.

The S_Empty flag indicates whether the tank 160 is in an "ink-empty" condition. The S_Empty flag contains either a value representing "on," which indicates the tank 160 being in the ink-empty condition, or a value representing "off," which indicates the tank 160 being not in the ink-empty condition, given by the CPU 130. The ink-empty condition may be, for example, a condition, in which the level of the ink stored in the tank 160, i.e., the liquid compartment 171, is lowered to the position of the upper end of the liquid outlet 174. When the tank 160 is in the ink-empty condition, and if the head 21 continues discharging the ink in the ink-empty condition, the nozzles 29 may not be filled with the ink but the air may be mixed with the ink in the nozzles 29. In this regard, when the tank 160 is in the ink-empty condition, the head 21 may no longer be allowed to discharge the ink.

The ASIC 135 is connected with the display 28 and a touch sensor 18 laid over the display 28. The display 28 may display information, which may or may not be related to the printer 10, and include, for example, a liquid crystal display and an organic EL display. The touch sensor 18 may detect a position on a screen in the display 28 touched by the user and output information related to the position. Therefore, when an object is displayed in the display 28, and the user touches on the object, the controller 130 may detect a touching action by the user to the object. A user's touching action on an object in the display 28 may include, for example, tapping, pressing, and flicking.

The display 28 may display screens, including the standby screen as shown in FIG. 13, first and second ink remainder indication screens as shown in FIGS. 14A-14B, first and second information screens as shown in FIGS. 15A-15B, a change setting screen as shown in FIG. 16A, and a detailed information screen as shown in FIG. 16B, in response to commands from the controller 130. Each screen to be displayed in the display 28 may contain one or more objects, which will be described further below. In the following paragraphs, objects related to the four colors of inks, i.e., magenta, cyan, yellow, and black, may be distinguished by letters M, C, Y, and Bk, respectively. In other words, the letters M, C, Y, and BK, may be appended to objects related to the colors of magenta, cyan, yellow, and black, respectively. Meanwhile, an object without a letter M, C, Y, or Bk may represent the overall objects including the object M related to magenta, the object C related to cyan, the object Y related to yellow, and the object B, related to black when the objects may not necessarily be distinguished by the colors. For example, an eighteenth object 268M, an eighteenth object 268C, an eighteenth object 268Y, and an eighteenth object 268Bk related to magenta, cyan, yellow, and black, respectively, which will be described further below, may be collectively called as an eighteenth object 268 in a singular form. It may be noted that the ordinal terms (e.g., first, second, . . . etc.) appended to the objects to be displayed in the screens on the display 28 may not necessarily be related to an order of significance or appearance of some objects over the other objects but should be considered merely as names of the objects.

[Standby Screen]

The standby screen as shown in FIG. 13 may be displayed in the display 28 when the printer 10 is in a standby mode. The standby screen may include function objects 73, which represent functions such as facsimile, copy, and scan, that are available to the user from the printer 10. When the user taps on one of the function objects 73, an advanced screen, which is not shown, related to the selected function may be displayed. Moreover, the standby screen may include a setting object 74, through which the screen to be displayed may be switched from the standby screen to a setting screen (not shown), and scroll objects 75, through which the screen being displayed may be scrolled in the display 28.

The standby screen contains a twentieth object 270, which indicates a remainder amount of the ink stored in the cartridge 200. In the example shown in FIG. 13, the twentieth object 270 is located at a lower-rightward area in the standby screen. Meanwhile, the location of the twentieth object 270 may not necessarily be limited to the lower-rightward area but may be anywhere within the standby screen.

The twentieth object 270 includes four (4) rectangular figures aligning side by side in a crosswise direction 72 in the display 28. The rectangular figures represent the four cartridges 200: the cartridge 200 to store the magenta ink, the cartridge 200 to store the cyan ink, the cartridge 200 to store the yellow ink, and the cartridge 200 to store the black ink, in the order from left to right. The shape of the figures to represent the cartridges 200 may not necessarily be limited to rectangles but may be in a different shape or may be replaced with signs. Moreover, the four figures may represent the cartridges 200 for different colors. In other words, the twentieth object 270 may not necessarily be limited to the examples described herein.

The twentieth object 270 may serve as a switcher object, through which the screen in the display 28 may be switched from the standby screen to the first or second ink remainder indication screen (see FIGS. 14A-14B), which will be described further below.

The standby screen may include a twenty-first object 271, which is displayed under a certain condition. In particular, the twenty-first object 271 may be displayed when a cartridge 200 to be exchanged with a new cartridge 200 is contained. In other words, the twenty-first object 271 may express shortage of the ink in the cartridge 200 and prompt the user to exchange the cartridge 200 with a new cartridge 200.

The twenty-first object 271 may include, but not necessarily be limited to, an exclamation mark (!). The twenty-first object 271 may cause the user to intuitively recognize that the ink in the cartridge 200 is exhausted. The twenty-first object 271 may be, for another example, a sign, a character, or a figure other than the exclamation mark, as long as the twenty-first object 271 may be likely to cause the user to recognize the exhaustion of the ink in the cartridge 200.

The twenty-first object 271 may be displayed over a frame of the twentieth object 270 corresponding to the cartridge 200, which exhausted the ink therein. In the example shown in FIG. 13, the twenty-first object 271 is displayed over the frame of the twentieth object 270 for the cyan ink, which is the second rectangle from the left.

The standby screen may include a twenty-second object 272, which is displayed under a certain condition. In particular, the twenty-second object 272 may be displayed when the cartridge 200 no longer contains a sufficient amount of ink to continue printing. In this regard, the twenty-second object 272 may express insufficiency of the ink in the cartridge 200 and cause the user to recognize that image printing may not be continued unless the cartridge 200 is exchanged with a new cartridge 200.

The twenty-second object 272 may include, but not necessarily be limited to, a cross-out mark (x). The twenty-second object 272 may cause the user to recognize that the ink is exhausted in the cartridge 200 and in the tank 160, and image printing may not be continued. The twenty-second object 272 may be, for another example, a sign, a character, or a figure other than the cross-out mark as long as the twenty-second object 272 may be likely to cause the user to recognize that no image printing on a sheet may be continued.

The twenty-second object 272 may be displayed over the frame of the twentieth object 270 corresponding to the cartridge 200, which may no longer continue printing. In the example shown in FIG. 13, the twenty-second object 272 is displayed over the frame of the twentieth object 270 for the yellow ink, which is the second rectangle from the right.

In response to a tapping action to the twentieth object 270 by the user, the screen in the display 28 may be switched from the standby screen (see FIG. 13) to one of the first ink remainder indication screen (see FIG. 14A) and the second ink remainder indication screen (see FIG. 14B), which indicate remaining amounts of the inks.

[First Ink Remainder Indication Screen]

The first ink remainder indication screen includes, as shown in FIG. 14A, a twenty-third object 273M containing a letter M for magenta, a twenty-third object 273C containing a letter C for cyan, a twenty-third object 273Y containing a letter Y for yellow, and a twenty-third object 273Bk containing letters Bk for black. Meanwhile, the twenty-third object 273 may not necessarily contain the letter M, C, Y, or Bk but may contain, for example, sign(s), character(s), or figure(s), as long as the object represents the color of magenta, cyan, yellow, or black.

The first ink remainder indication screen further includes a seventeenth object 267M and an eighteenth object 268M. The seventeenth object 267M indicates a first remainder amount being an amount of the ink stored in the cartridge 200 for magenta. The eighteenth object 268M indicates the second remainder mount being an amount of the ink stored in the liquid compartment 171 in the tank 160 connected with the cartridge 200 for magenta. The seventeenth object 267M and the eighteenth object 268M may be located at positions lower than the twenty-third object 273M representing magenta. The twenty-third object 273M may express that the seventeenth object 267M and the eighteenth object 268M are associated with the magenta ink.

The seventeenth object 267M and the eighteenth object 268M align along a perpendicular direction 71 in the display 28. The seventeenth object 267M and the eighteenth object 268M may be rectangular bars, each of which has a length extending along the perpendicular direction 71 of the display 28 and a width extending along the crosswise direction 72 of the display 28. The width of the seventeenth object 267M and the width of the seventeenth object 267M may be the same.

The first ink remainder indication screen further includes a seventeenth object 267C and an eighteenth object 268C. The seventeenth object 267C indicates a first remainder amount being an amount of the ink stored in the cartridge 200 for cyan. The eighteenth object 268C indicates the second remainder mount being an amount of the ink stored in the liquid compartment 171 in the tank 160 connected with the cartridge 200 for cyan. The seventeenth object 267C and the eighteenth object 268C may be located at positions lower than the twenty-third object 273C representing cyan. The twenty-third object 273C may express that the seventeenth object 267C and the eighteenth object 268C are associated with the cyan ink.

The seventeenth object 267C and the eighteenth object 268C align along the perpendicular direction 71 in the display 28. The seventeenth object 267C and the eighteenth object 268C may be rectangular bars, each of which has a length extending along the perpendicular direction 71 of the display 28 and a width extending along the crosswise direction 72 of the display 28. The width of the seventeenth object 267C and the width of the eighteenth object 268C may be the same. The seventeenth object 267C may be arranged at a rightward adjoining position to the seventeenth object 267M for magenta, and the eighteenth object 268C may be arranged at a rightward adjoining position to the eighteenth object 268M for magenta.

The first ink remainder indication screen further includes a seventeenth object 267Y and an eighteenth object 268Y. The seventeenth object 267Y indicates a first remainder amount being an amount of the ink stored in the cartridge 200 for yellow. The eighteenth object 268Y indicates the second remainder mount being an amount of the ink stored in the liquid compartment 171 in the tank 160 connected with the cartridge 200 for yellow. The seventeenth object 267Y and the eighteenth object 268Y may be located at positions lower than the twenty-third object 273Y representing yellow. The twenty-third object 273Y may express that the seventeenth object 267Y and the eighteenth object 268Y are associated with the yellow ink.

The seventeenth object 267Y and the eighteenth object 268Y align along the perpendicular direction 71 in the display 28. The seventeenth object 267Y and the eighteenth object 268Y may be rectangular bars, each of which has a length extending along the perpendicular direction 71 of the display 28 and a width extending along the crosswise direction 72 of the display 28. The width of the seventeenth object 267Y and the width of the eighteenth object 268Y may be the same. The seventeenth object 267Y may be arranged at a rightward adjoining position to the seventeenth object 267C for cyan, and the eighteenth object 268Y may be arranged at a rightward adjoining position to the eighteenth object 268C for cyan.

The first ink remainder indication screen further includes a seventeenth object 267Bk and an eighteenth object 268Bk. The seventeenth object 267Bk indicates a first remainder amount being an amount of the ink stored in the cartridge 200 for black. The eighteenth object 268Bk indicates the second remainder mount being an amount of the ink stored in the liquid compartment 171 in the tank 160 connected with the cartridge 200 for black. The seventeenth object 267Bk and the eighteenth object 268Bk may be located at positions lower than the twenty-third object 273Bk representing black. The twenty-third object 273Bk may express that the seventeenth object 267Bk and the eighteenth object 268Bk are associated with the black ink.

The seventeenth object 267Bk and the eighteenth object 268Bk align along the perpendicular direction 71 in the display 28. The seventeenth object 267Bk and the eighteenth object 268*bk* may be rectangular bars, each of which has a length extending along the perpendicular direction 71 of the display 28 and a width extending along the crosswise direction 72 of the display 28. The width of the seventeenth object 267Bk and the width of the eighteenth object 268Bk may be the same. The seventeenth object 267Bk may be arranged at a rightward adjoining position to the seventeenth object 267Y for yellow, and the eighteenth object 268Bk may be arranged at a rightward adjoining position to the eighteenth object 268Y for yellow.

The shapes of the seventeenth object 267 and the eighteenth object 268 may not necessarily be limited to the rectangles elongated in the perpendicular direction 71 but may be in other shapes as long as the seventeenth object 267 represents the remainder amount of the ink in the cartridge 200 and the eighteenth object 268 represents the remainder amount of the ink in the tank 160. Moreover, the seventeenth object 267 and the eighteenth object 268 may not necessarily align along the perpendicular direction 71 but may align along the crosswise direction.

The first ink remainder indication screen may include a twenty-fourth object 274, which is displayed under a certain condition. The twenty-fourth object 274 may include, but not necessarily be limited to, an exclamation mark (!), similarly to the twenty-first object 271 described earlier. The twenty-fourth object 274 may be displayed over a frame of the seventeenth object 267 corresponding to the cartridge 200, which exhausted the ink therein. In the example shown in FIG. 14A, the twenty-fourth object 274 is displayed over the frame of the seventeenth object 267C for the cyan ink. The twenty-fourth object 274 may indicate shortage of the ink in the cartridge 200 and cause the user to intuitively recognize that the ink in the cartridge 200 is exhausted.

The first ink remainder indication screen may include a twenty-fifth object 275, which is displayed under a certain condition. The twenty-fifth object 275 may include, but not necessarily be limited to, a cross-out mark (x), similarly to the twenty-second object 272 described earlier. The twenty-fifth object 275 may be displayed over the frame of the seventeenth object 267 corresponding to the cartridge 200, which exhausted the ink therein, and a frame of the eighteenth object 268 corresponding to the tank 160, which exhausted the ink therein. In the example shown in FIG. 14A, the twenty-fifth object 275 is displayed over the frame of the seventeenth object 267Y and the frame of the eighteenth object 268Y for the yellow ink. The twenty-fifth object 275 may express insufficiency of the ink in the cartridge 200 and cause the user to intuitively recognize that image printing may not be continued unless the cartridge 200 is exchanged with a new cartridge 200.

The seventeenth object 267 displayed in the first ink remainder indication screen is in a form similar to the twentieth object 270 to be displayed in the standby screen (see FIG. 13). In this regard, the twentieth object 270 is a form downsized from the seventeenth object 267, and the seventeenth object 267 and the twentieth object 270 indicate an equal ink remainder amount.

Moreover, the twenty-fourth object 274 and the twenty-fifth object 275 to be displayed in the first ink remainder indication screen are displayed in conjunction with the twenty-first object 271 and the twenty-second object 272 displayed in the standby screen. Therefore, when the twenty-first object 271 containing the exclamation mark (!) is displayed in the standby screen, the twenty-fourth object 274 containing the exclamation mark (!) is displayed as well in the first ink remainder indication screen. When the twenty-second object 272 containing the cross-out mark (x) is displayed in the standby screen, the twenty-fifth object 275 containing the cross-out mark (x) is displayed as well in the first ink remainder indication screen.

Meanwhile, the twentieth object 270 may not necessarily change the rectangular form thereof depending on the remainder amount of the ink in the cartridge 200. In other words, the twentieth object may merely serve as the switcher object, through which the screen in the display 28 may be switched from the standby screen to the first ink remainder indication screen.

The first ink remainder indication screen contains a fourth object 254 and a first object 251. The fourth object 254 includes a character string "Printable quantity (ISO equivalent)." The first object 251 includes a first object 251M indicating a printable quantity (ISO equivalent) for the magenta ink, a first object 251C indicating a printable quantity (ISO equivalent) for the cyan ink, a first object 251Y indicating a printable quantity (ISO equivalent) for the yellow ink, and a first object 251Bk indicating a printable quantity (ISO equivalent) for the black ink.

The fourth object 254 may be, but not necessarily be limited to, located at a lower position with respect to the eighteenth object 268. The printable quantity (ISO equivalent) cited in the fourth object 254 denotes a quantity of sheets printable in a current remainder amount of the ink if images are hypothetically printed in a test method compliant with requirements prescribed by International Organization for Standardization (ISO). The test method prescribed by ISO requires printing a predetermined pattern of image on a predetermined type of sheet in a predetermined level of environment (e.g., temperature). The printable quantity (ISO equivalent) may provide a unified standard to users.

The first object 251M may be located at a position lower than the twenty-third object 273M, the seventeenth object 267M, and the eighteenth object 268M. The first object 251M located at the position lower than the twenty-third object 273M, the seventeenth object 267M, and the eighteenth object 268M may express that the first object 251M is associated with the magenta ink. Moreover, the first object 251M may be located at a position lower than the fourth object 254.

The first object 251M indicates a quantity of sheets printable by the remainder amount of the magenta ink in the cartridge 200 and the tank 160. In the example shown in FIG. 14A, the first object 251M indicates a quantity "700," which suggests that image printing on 700 sheets (ISO equivalent) is presumed to be possible.

The first object 251C may be located at a position lower than the twenty-third object 273C, the seventeenth object 267C, and the eighteenth object 268C. The first object 251C located at the position lower than the twenty-third object 273C, the seventeenth object 267C, and the eighteenth object 268C may express that the first object 251C is associated with the cyan ink. Moreover, the first object 251C may be located at a position lower than the fourth object 254.

The first object 251C indicates a quantity of sheets printable by the remainder amount of the cyan ink in the cartridge 200 and the tank 160. In the example shown in FIG. 14A, the first object 251C indicates a quantity "200," which suggests that image printing on 200 sheets (ISO equivalent) is presumed to be possible.

The first object 251Y may be located at a position lower than the twenty-third object 273Y, the seventeenth object 267Y, and the eighteenth object 268Y. The first object 251Y located at the position lower than the twenty-third object 273Y, the seventeenth object 267Y, and the eighteenth object 268Y may express that the first object 251Y is associated with the yellow ink. Moreover, the first object 251Y may be located at a position lower than the fourth object 254.

The first object 251Y indicates a quantity of sheets printable by the remainder amount of the yellow ink in the cartridge 200 and the tank 160. In the example shown in FIG. 14A, the first object 251Y indicates a quantity "0," which suggests that no image printing on a sheet (ISO equivalent) is presumed to be possible.

The first object 251Bk may be located at a position lower than the twenty-third object 273Bk, the seventeenth object 267Bk, and the eighteenth object 268Bk. The first object 251Bk located at the position lower than the twenty-third object 273Bk, the seventeenth object 267Bk, and the eighteenth object 268Bk may express that the first object 251Bk is associated with the black ink. Moreover, the first object 251Bk may be located at a position lower than a third object 253.

The first object 251Bk indicates a quantity of sheets printable by the remainder amount of the black ink in the cartridge 200 and the tank 160. In the example shown in FIG. 14A, the first object 251Bk indicates a quantity "2300," which suggests that image printing on 2300 sheets (ISO equivalent) is presumed to be possible.

The quantity to be contained in the first object 251 varies depending on the remainder amount of the ink in the cartridge 200 and the tank 160. The fourth object 254 including the text "Printable quantity (ISO equivalent)" may serve as a label to cause the user to recognize that the printable quantity in the first object 251 being displayed is based on the ISO standard.

The first ink remainder indication screen may include a sixth object 256, which enables the user to change settings for the printable quantity. The sixth object 256 may contain a letter "i." Meanwhile, the sixth object 256 may not necessarily contain the letter "i" but may contain character(s), figure(s), or sign(s) other than "i."

Tapping actions on the sixth object 256 and other objects by the user may cause the screen in the display 28 to shift to a second ink remainder indication screen, as shown in FIG. 14B. Transition of the screens in the display 28 will be described further below.

[Second Ink Remainder Indication Screen]

The second ink remainder indication screen contains, as shown in FIG. 14B, the seventeenth object 267 indicating the remainder amount of the ink in the cartridge 200 and the eighteenth object 268 indicating the remainder amount of the ink in the tank 160, which are similar to those in the first ink remainder indication screen (see FIG. 14B).

The second ink remainder indication screen includes a fifth object 255 and a second object 252. The fifth object 255 includes a character string "Printable quantity (consumption basis)." The second object 252 includes a second object 252M indicating a printable quantity (consumption basis) for the magenta ink, a second object 252C indicating a printable quantity (consumption basis) for the cyan ink, a second object 252Y indicating a printable quantity (consumption basis) for the yellow ink, and a second object 252Bk indicating a printable quantity (consumption basis) for the black ink.

The fifth object 255 may be, but not necessarily be limited to, located at a lower position with respect to the eighteenth object 268. The printable quantity (consumption basis) cited in the fifth object 255 denotes a quantity of sheets printable in a current remainder amount of the ink and is calculated on basis of a quantity of sheets, on which images were actually printed in the past, per unit amount of ink.

The second object 252M may be located at a position lower than the twenty-third object 273M, the seventeenth object 267M, and the eighteenth object 268M. The second object 252M located at the position lower than the twenty-third object 273M, the seventeenth object 267M, and the eighteenth object 268M may express that the second object 252M is associated with the magenta ink. Moreover, the second object 252M may be located at a position lower than the fifth object 255.

The second object 252M indicates a quantity of sheets (consumption basis) printable by the remainder amount of the magenta ink in the cartridge 200 and the tank 160 on basis of the ink consumption in the past. In the example shown in FIG. 14B, the second object 252M indicates a quantity "500," which suggests that image printing on 500 sheets (consumption basis) is presumed to be possible.

The second object 252C may be located at a position lower than the twenty-third object 273C, the seventeenth object 267C, and the eighteenth object 268C. The second object 252C located at the position lower than the twenty-third object 273C, the seventeenth object 267C, and the eighteenth object 268C may express that the second object 252C is associated with the cyan ink. Moreover, the second object 252C may be located at a position lower than the fifth object 255.

The second object 252C indicates a quantity of sheets (consumption basis) printable by the remainder amount of the cyan ink in the cartridge 200 and the tank 160 on basis of the ink consumption in the past. In the example shown in FIG. 14B, the second object 252C indicates a quantity "150," which suggests that image printing on 150 sheets (consumption basis) is presumed to be possible.

The second object 252Y may be located at a position lower than the twenty-third object 273Y, the seventeenth object 267Y, and the eighteenth object 268Y. The second object 252Y located at the position lower than the twenty-third object 273Y, the seventeenth object 267Y, and the eighteenth object 26Y may express that the second object 252Y is associated with the yellow ink. Moreover, the second object 252Y may be located at a position lower than the fifth object 255.

The second object 252Y indicates a quantity of sheets (consumption basis) printable by the remainder amount of the yellow ink in the cartridge 200 and the tank 160 on basis of the ink consumption in the past. In the example shown in FIG. 14B, the second object 252Y indicates a quantity "0," which suggests that no image printing on a sheet (consumption basis) is presumed to be possible.

The second object 252Bk may be located at a position lower than the twenty-third object 273Y, the seventeenth object 267Bk, and the eighteenth object 268Bk. The second object 252Bk located at the position lower than the twenty-third object 273Bk, the seventeenth object 267Bk, and the eighteenth object 268Bk may express that the second object 252Bk is associated with the black ink. Moreover, the second object 252Bk may be located at a position lower than a seventh object 257.

The second object 252Bk indicates a quantity of sheets (consumption basis) printable by the remainder amount of the black ink in the cartridge 200 and the tank 160 on basis of the ink consumption in the past. In the example shown in FIG. 14B, the second object 252Bk indicates a quantity "2000," which suggests that image printing on 2000 sheets (consumption basis) is presumed to be possible.

The quantity in the second object 252 varies depending on the remainder amount of the ink in the cartridge 200 and the tank 160. The fifth object 255 including the text "Printable quantity (consumption basis)" may serve as a label to cause the user to recognize that the printable quantity in the second object 252 being displayed is based on the ink consumption.

The second ink remainder indication screen may contain the seventh object 257, which is similar to the sixth object 256 in the first ink remainder indication screen and enables the user to change settings for the printable quantity. The seventh object 257 may contain a letter "i." The seventh object 257 may not necessarily contain the letter "i" but may contain character(s), figure(s), or sign(s) other than "i." Meanwhile, if the seventh object 257 has the letter, character, figure, or sign same as the sixth object 256, the user may easily recognize that the seventh object 257 has the same function as the sixth object 256.

The sixth object 256 may cause the indication of the printable quantity to be converted from the ISO equivalent to the consumption basis, while the seventh object 257 may cause the indication of the printable quantity to be converted from the consumption basis to the ISO equivalent, as described further in the following paragraphs.

[First Information Screen]

The sixth object 256 may cause the screen in the display 28 to shift from the first ink remainder indication screen (see FIG. 14A) to a first information screen as shown in FIG. 15A. In particular, when the user taps on the sixth object 256 in the first ink remainder indication screen, the first information screen may be displayed in place of the first ink remainder indication screen in the display 28.

The first information screen contains a twenty-sixth object 276 and a twenty-seventh object 277. The twenty-sixth object 276 includes a character string "(?) Printable quantity (ISO equivalent)." The twenty-seventh object 277 includes a twenty-seventh object 277M indicating a printable quantity for the magenta ink, a twenty-seventh object 277C indicating a printable quantity for the cyan ink, a twenty-seventh object 277Y indicating a printable quantity for the yellow ink, and a twenty-seventh object 277Bk indicating a printable quantity for the black ink.

The twenty-sixth object 276 may be displayed at an uppermost area in the first information screen. The twenty-sixth object 276 indicates that the printable quantity currently being displayed is based on the ISO standard. In this regard, the twenty-sixth object 276 may not necessarily be limited to the character string but may include, for example, character(s), sign(s), or figure(s) as long as the content of the twenty-sixth object 276 indicates the printable quantity calculated on basis of the ISO standard.

The twenty-seventh object 277 may be displayed at a position lower than the twenty-sixth object 276. Among the twenty-seventh objects 277M, 277C, 277Y, 277Bk, the twenty-seventh object 277M may be displayed at a leftmost position in the first information screen, the twenty-seventh object 277C may be displayed at a rightward adjoining position to the twenty-seventh object 277M, the twenty-seventh object 277Y may be displayed at a rightward adjoining position to the twenty-seventh object 277C, and the twenty-seventh object 277Bk may be displayed at a rightward adjoining position to the twenty-seventh object 277Y. In other words, the twenty-seventh objects 277M, 277C, 277Y, 277Bk align side by side in the same order as the twenty-third objects 273M, 273C, 273Y, 273Bk in the first ink remainder indication screen (see FIG. 14A).

The twenty-seventh object 277M contains, in the example shown in FIG. 15A, a letter "M" and a number "700," which indicate that image printing on 700 sheets on basis of the ISO standard is presumed to be possible with the currently remaining magenta ink, similarly to the twenty-third object 273M and the first object 251M in the first ink remainder indication screen (see FIG. 14A). The twenty-seventh object 277C contains, in the example shown in FIG. 15A, a letter "C" and a number "200," which indicate that image printing on 200 sheets on basis of the ISO standard is presumed to be possible with the currently remaining cyan ink, similarly to the twenty-third object 273C and the first object 251C in the first ink remainder indication screen (see FIG. 14A). The twenty-seventh object 277Y contains, in the example shown in FIG. 15A, a letter "Y" and a number "0," which indicate that no image printing on a sheet on basis of the ISO standard is presumed to be possible with the currently remaining yellow ink, similarly to the twenty-third object 273Y and the first object 251Y in the first ink remainder indication screen (see FIG. 14A). The twenty-seventh object 277Bk contains, in the example shown in FIG. 15A, letters "Bk" and a number "2300," which indicate that image printing on 2300 sheets on basis of the ISO standard is presumed to be possible with the currently remaining black ink, similarly to the twenty-third object 273Bk and the first object 251Bk in the first ink remainder indication screen (see FIG. 14A).

The first information screen contains an eighth object 258, which includes a character string "Calculation is based on document and conditional environment prescribed by the general document yield standard "ISO/IEC24711" to explain the printable quantity on basis of the ISO standard. The eighth object 258 may be located at a position lower than the twenty-seventh object 277. The text of the character string in the eighth object 258 may not necessarily be limited to the sentence shown in FIG. 15A but may include or may be replaced with different word(s) or sentence(s).

The first information screen contains a third object 253 and a thirteenth object 263. The third object 253 contains character strings "Change settings" and may be located at a position lower than the eighth object 258. The thirteenth object 263 contains a character string "Return" and may be located at a position lower than the eighth object 258 and rightward from the third object 253.

The third object 253 may serve as a switcher object, through which the screen in the display 28 is switched from the first information screen, as shown in FIG. 15A, to a change setting screen, as shown in FIG. 16A. The text in the third object 253 may not necessarily be limited to the character strings "Change setting" as shown in FIG. 15A but may be replaced with different word(s), symbol(s), or figure(s) as long as the third object 253 suggests that the first information screen may be shifted to the change setting screen through the third object 253.

The thirteenth object 263 is a switcher object, through which the screen in the display 28 is switched from the first information screen, as shown in FIG. 15A, to the first ink remainder indication screen, as shown in FIG. 14A. The text in the thirteenth object 263 may not necessarily be limited to the character string "Return" as shown in FIG. 15A but may be replaced with different word(s), symbol(s), or figure(s) as long as the thirteenth object 263 suggests that the first information screen may be shifted to the first ink remainder indication screen through the thirteenth object 263.

The twenty-sixth object 276, the twenty-seventh object 277, the eighth object 258, the third object 253, and the thirteenth object 263 may not necessarily be located to the positions described above or shown in FIG. 15A but may be located at any positions within the first information screen.

[Second Information Screen]

The seventh object 257 as shown in FIG. 14B may cause the screen in the display 28 to shift from the second ink remainder indication screen (see FIG. 14B) to a second information screen as shown in FIG. 15B. In particular, when the user taps on the seventh object 257 in the second ink remainder indication screen, the second information screen may be displayed in place of the second ink remainder indication screen in the display 28.

The second information screen contains a twenty-eighth object 278 and a twenty-ninth object 279. The twenty-eighth object 278 includes a character string "(?) Printable quantity (consumption basis)." The twenty-ninth object 279 includes a twenty-ninth object 279M indicating a printable quantity for the magenta ink, a twenty-ninth object 279C indicating a printable quantity for the cyan ink, a twenty-ninth object 279Y indicating a printable quantity for the yellow ink, and a twenty-ninth object 279Bk indicating a printable quantity for the black ink.

The twenty-eighth object 278 may be displayed at an uppermost area in the second information screen. The twenty-eighth object 278 indicates that the printable quantity currently being displayed is based on the ink consumption in the past. In this regard, the twenty-eighth object 278 may not necessarily be limited to the character string but may include, for example, character(s), sign(s), or figure(s) as long as the content of the twenty-eighth object 278 indicates the printable quantity calculated on basis of the past ink consumption.

The twenty-ninth object 279 may be displayed at a position lower than the twenty-eighth object 278. Among the twenty-ninth object 279M, 279C, 279Y, 279Bk, the twenty-ninth object 279M may be displayed at a leftmost position in the second information screen, the twenty-ninth object 279C may be displayed at a rightward adjoining position to the twenty-ninth object 279M, the twenty-ninth object 279Y may be displayed at a rightward adjoining position to the twenty-ninth object 279C, and the twenty-ninth object 279Bk may be displayed at a rightward adjoining position to the twenty-ninth object 279Y. In other words, the twenty-ninth objects 279M, 279C, 279Y, 279Bk align side by side in the same order as the twenty-third objects 273M, 273C, 273Y, 273Bk in the second ink remainder indication screen (see FIG. 14B).

The twenty-ninth object 279M contains, in the example shown in FIG. 15B, a letter "M" and a number "500," which indicate that image printing on 500 sheets on basis of the ink consumption is presumed to be possible with the currently remaining magenta ink, similarly to the twenty-third object 273M and the second object 252M in the second ink remainder indication screen (see FIG. 14B). The twenty-ninth object 279C contains, in the example shown in FIG. 15B, a letter "C" and a number "150," which indicate that image printing on 150 sheets on basis of the ink consumption is presumed to be possible with the currently remaining cyan ink, similarly to the twenty-third object 273C and the second object 252C in the second ink remainder indication screen (see FIG. 14B). The twenty-ninth object 279Y contains, in the example shown in FIG. 15B, a letter "Y" and a number "0," which indicate that no image printing on a sheet on basis of the ink consumption is presumed to be possible with the currently remaining yellow ink, similarly to the twenty-third object 273Y and the second object 252Y in the second ink remainder indication screen (see FIG. 14B). The twenty-ninth object 279Bk contains, in the example shown in FIG. 15B, letters "Bk" and a number "2000," which indicate that image printing on 2000 sheets on basis of the ink consumption is presumed to be possible with the currently remaining black ink, similarly to the twenty-third object 273Bk and the second object 252Bk in the second ink remainder indication screen (see FIG. 14B).

The second information screen contains a ninth object 259, which contains a character string "Calculation is based on the amount of ink consumed under your document and conditional environment" to explain the printable quantity on basis of the user's ink consumption. The ninth object 259 may be located at a position lower than the twenty-ninth object 279. The text of the character string in the ninth object 259 may not necessarily be limited to the sentence shown in FIG. 15B but may include or may be replaced with different word(s) or sentence(s).

The second information screen contains the third object 253 and a fourteenth object 264. The third object 253 contains character strings "Change settings" and may be located at a position lower than the ninth object 259. The fourteenth object 264 contains a character string "Return" and may be located at a position lower than the ninth object 259 and rightward from the third object 253.

The third object 253 may serve as a switcher object, through which the screen in the display 28 is switched from the second information screen, as shown in FIG. 15B, to the change setting screen, as shown in FIG. 16A. The content in the third object 253 may not necessarily be limited to the character strings "Change setting" as shown in FIG. 15B but may be replaced with different word(s), symbol(s), or figure(s) as long as the third object 253 suggests that the second information screen may be shifted to the change setting screen through the third object 253.

The fourteenth object 264 is a switcher object, through which the screen in the display 28 is switched from the second information screen, as shown in FIG. 15B, to the second ink remainder indication screen, as shown in FIG. 14B. The content in the fourteenth object 264 may not necessarily be limited to the word "Return" as shown in FIG. 15B but may be replaced with different word(s), symbol(s), or figure(s) as long as the fourteenth object 264 suggests that the second information screen may be shifted to the second ink remainder indication screen through the fourteenth object 264.

The twenty-eighth object 278, the twenty-ninth object 279, the ninth object 259, the third object 253, and the fourteenth object 264 may not necessarily be located to the positions described above or shown in FIG. 15B but may be located at any positions within the second information screen.

[Change Setting Screen]

The change setting screen as shown in FIG. 16A contains a tenth object 260, which contains a character string "Setting for printable quantity indication," which suggests options for settings to display the printable quantity between the printable quantity based on the ISO standard and the printable quantity on the consumption basis. The content of the tenth object 260 may not necessarily be limited to the character string but may include, for example, character(s), sign(s), or figure(s) as long as the content of the tenth object 260 suggests that one of the setting options for the printable quantity is selectable between the printable quantity based on the ISO standard and the printable quantity on the consumption basis.

The change setting screen contains an eleventh object 261 and a twelfth object 262. The eleventh object 261 includes character strings: "ISO equivalent" and "Calculation based on ISO standard." The twelfth object 262 includes character strings: "Consumption basis" and "Calculation based on ink consumption." The eleventh object 261 may be located at a position lower than the tenth object 260. The twelfth object 262 may be located to at a position lower than the eleventh object 261.

The eleventh object 261 may cause the printable quantity calculated on ISO standard basis to be displayed in the first ink remainder indication screen (see FIG. 14A). Moreover, the eleventh object 261 may serve as a switcher object, through which the screen in the display 28 may be switched from the change setting screen, as shown in FIG. 16A, to the first information screen, as shown in FIG. 15A. A tapping action on the eleventh object 261 by the user may cause the screen in the display 28 to shift from the change setting screen to the first information screen.

The twelfth object 262 may cause the printable quantity calculated on the ink consumption basis to be displayed in the second ink remainder indication screen (see FIG. 14B). Moreover, the twelfth object 262 may serve as a switcher object, through which the screen in the display 28 may be switched from the change setting screen, as shown in FIG. 16A, to the second information screen, as shown in FIG. 15B. A tapping action on the twelfth object 262 by the user may cause the screen in the display 28 to shift from the change setting screen to the second information screen.

The change setting screen as shown in FIG. 16A contains a fifteenth object 265, which contains a character string "About printable quantity indication." The fifteenth object 265 may be located at a position lower than the twelfth object 262.

The tenth object 260, the eleventh object 261, the twelfth object 262, and the fifteenth object 265 may not necessarily be located to the positions described above or shown in FIG. 16A but may be located at any positions within the change setting screen.

The fifteenth object 265 may serve as a switcher object, through which the screen in the display 28 may be switched from the change setting screen, as shown in FIG. 16A, to a detailed information screen, as shown in FIG. 16B. In other words, the fifteenth object 265 is linked to the detailed information screen, and the fifteenth object 265 indicates connection to the detailed information screen. A tapping action on the fifteenth object 265 by the user may cause the screen in the display 28 to shift from the change setting screen to the detailed information screen. The content of the fifteenth object 265 may not necessarily be limited to the character string as described above of shown in FIG. 16A but may include, for example, character(s), sign(s), or figure(s) as long as the content of the tenth object 260 suggests that the change setting screen may be shifted to the detailed information screen through the tenth object 260.

[Detailed Information Screen]

The detailed information screen contains a thirtieth object 280, which contains a character string "(?) About printable quantity" to suggest that the detailed information screen explains the printable quantities. The content of the thirtieth object 280 may not necessarily be limited to the character string as described above or shown in FIG. 16B but may include, for example, character(s), sign(s), or figure(s) as long as the content of the thirtieth object 260 suggests that the detailed information is an informative screen to explain the printable quantity.

The detailed information screen contains a sixteenth object 266, which contains character strings "ISO equivalent," "Calculate printable quantity based on ISO standard," "Consumption basis," and "Based on your ink consumption." In other words, the sixteenth object 266 describes the printable quantity on the ISO standard basis and the printable quantity on basis of the ink consumption so that the user may recognize the difference between the printable quantities on the ISO standard basis and the ink consumption basis. The content of the sixteenth object 266 may not necessarily be limited to the text as described above or shown in FIG. 16B but may include or may be replaced with different word(s) or sentence(s) as long as the content of the sixteenth object 266 provides descriptive information concerning the printable quantity on basis of ISO standard and the printable quantity on basis of the ink consumption.

Moreover, the detailed information screen may contain, as shown in FIG. 16B, scroll objects 76, through which the screen being displayed may be scrolled in the display 28.

The detailed information screen contains a thirty-first object 281, which contains a character string "OK." The thirty-first object 281 serves as a switcher object, through which the screen in the display 28 may be switched from the detailed information screen, as shown in FIG. 16B, to the change setting screen, as shown in FIG. 16A. A tapping action on the thirty-first object 281 by the user may cause the screen in the display 28 to shift from the detailed information screen to the change setting screen.

[Processes in the Printer 10]

Processes to be taken the printer 10 will be described with reference to the flowcharts shown in FIGS. 7-12 and the drawings in FIGS. 13 through 15A-15B. Processes described in the following paragraphs and illustrated in the flowcharts in FIGS. 7-12 may be implemented by the CPU 131 running the controlling program 35 stored in the ROM 132 or by a hardware circuit (not shown) mounted on the controller 130 (see FIG. 6). An order to process the steps in the flowcharts may not necessarily be fixed to the flow described below but may be altered within a scope of the present invention as set forth in the appended claims.

[Image Forming Process]

The controller 130 activates an image forming process as shown in FIG. 7 in response to input of a print command in the printer 10. The print command by the user may be received through, for example, but not necessarily limited to, the operation panel 22 or the display 28. For another example, the print command may be received from an external device through the communication interface 34. In the following paragraphs, each of the cartridges 200 for magenta, cyan, yellow, and black inks and each of the four tanks 160 for magenta, cyan, yellow, and black inks may be collectively called as the cartridge 200 and the tank 160, respectively, in the singular form. In other words, each of the steps in the processes described below may be repeated for four times for the four colored inks although the steps in the processes may be described solely once.

In S11, the controller 130 determines the value in the S_Empty flag for the cartridge 200. In other words, the controller 130 determines whether the printer 10 contains the sufficient amount of ink to print an image on a sheet. If the controller 130 determines that the S_Empty flags is on (S11: ON), in S12, the controller 130 obtains the attachment signal for the cartridge 200. In S13, the controller 130 determines whether the attachment signal for the cartridge 200 changes from the lower level (L) to the higher level (H) and thereafter from the higher level (H) to the lower level (L). In other words, the controller 130 monitors the changes in the attachment signals to determine whether the cartridge 200 with the lowered ink level has been exchanged with another cartridge 200.

In S13, if the controller 130 determines that the cartridge 200 has not been exchanged (S13: NO), the flow returns to S12 and obtains the attachment signal for another round. In S13, if the controller 130 determines that the cartridge 200 has been exchanged with another cartridge 200 (S13: YES), the flow proceeds to a first updating process in S14. Alternatively to S12-S13, the controller 130 may conduct another process to determine the exchange of the cartridges 200. For example, the controller 130 may read the IC chip 247 in the cartridge 200 to obtain a serial number of the cartridge 200 and determine whether the obtained serial number matches a serial number having been saved in the EEPROM 134.

[First Updating Process]

Figure 8A:
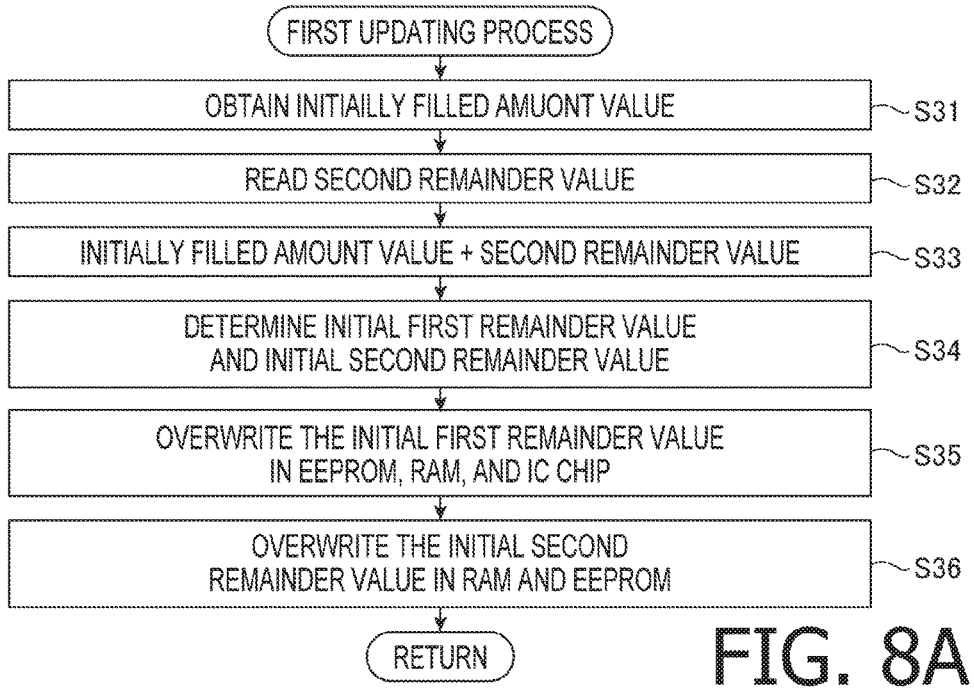

The first updating process shown in FIG. 8A may be conducted in order to update a first remainder value, which indicates the first remainder amount, and a second remainder value, which indicates the second remainder amount, when the cartridges 200 are exchanged. As mentioned earlier, the first remainder amount is an amount of the ink remaining in the cartridge 200, and the second remainder amount is an amount of the ink remaining in the tank 160.

In S31, the controller 130 obtains an initially filled amount value, which indicates an amount of the ink initially loaded in the cartridge 200. The controller 130 may read type information in the IC chip 247 in the cartridge 200 and obtain the initially filled amount value corresponding to the type information from the EEPROM 134. In the EEPROM 134, a table indicating correspondence between the type information and the initially filled amount value is prepared and stored in advance. Alternatively, the controller 130 may obtain an initial value for the first remainder value stored in the IC chip 247 in the cartridge 200 and use the obtained initial value as the initially filled amount value.

In S32, the controller 130 reads the second remainder value in the RAM 133. The second remainder value indicates an amount of the ink having been stored in the tank 160 immediately before the cartridge 200 was exchanged.

In S33, the controller 130 adds the initially filled amount value to the second remainder value to calculate a total remainder value, which indicates a total remainder amount of the ink. In S34, the controller 130 updates the first remainder value and the second remainder value for the new cartridge 200 based on the total remainder value calculated in S130. When the new cartridge 200 is attached to the attachment case 150, a portion of the ink in the cartridge 200 may flow into the liquid compartment 171 in the tank 160. In this regard, the level of the ink in the cartridge 200 may be lowered, and the level of the ink in the tank 160 may rise. In this regard, the updated first remainder value indicates the amount of the ink remaining in the cartridge 200 after the portion of the ink flowed into the tank 160, and the updated second remainder value indicates the amount of the ink in the tank 160 that accepted the ink flowed from the cartridge 200. The first remainder value and the second remainder value may be updated by, for example, calculation through a function formula or based on a table as described in the following paragraph.

The shapes of the liquid compartment 210 in the cartridge 200 and the liquid compartment 171 in the tank 160 are fixed and known to the manufacturer prior to shipping. Therefore, based on the shapes of the liquid compartment 210 and the liquid compartment 171, and based on the total remainder value, the first remainder value and the second remainder value are obvious to the manufacturer. Therefore, formulas, by which the first remainder value and the second remainder value are calculated based on the total remainder value, or a table, in which the total remainder value is associated with the first remainder value and the second remainder value, may be prepared in advance and stored in the EEPROM 134 by the manufacturer. The controller 130 may determine the first remainder value and the second remainder value based on the formulas or the table.

In S35, the controller 130 saves the newly determined first remainder value as an initial first remainder value in the EEPROM 134 and in the RAM 133. Further, the controller 130 writes the new first remainder value over the existing first remainder value in the memory device in the IC chip 247. Moreover, the controller 130 saves the newly determined second remainder value as an initial second remainder value in the EPROM 134 and in the RAM 133. The first updating process ends thereat. The flow returns to S14 in FIG. 7.

Following the first updating process in S14, in S15, the controller 130 sets the S_Empty flag off and returns to S11.

In S11, the controller 130 determines the value in the S_Empty flag for the cartridge 200. If the controller 130 determines that the S_Empty flag is off (S11: OFF), in S16, the controller 130 forms an image on a sheet. Forming an image on a sheet consumes inks; therefore, the levels of the inks in the tanks 160 may be lowered. In this regard, in S17, the controller obtains the liquid-level signals before and after forming the image in S16 from the liquid-level sensor 155.

In S18, the controller 130 determines whether the obtained liquid-level signals indicate a change in the liquid level in the tank 160. If the controller 130 determines that the liquid-level signals stay unchanged at the lower level (L) (S18: L->L), the controller 130 determines that the ink in the cartridge 200 is not exhausted. In this regard, as mentioned earlier, the liquid-level sensor 155 outputs the lower-leveled signal (L) when the level of the ink in the liquid compartment 171 is higher than the threshold position P (see FIG. 3). The flow proceeds to S19, and the controller 130 conducts a second updating process.

[Second Updating Process]

Figure 8B:
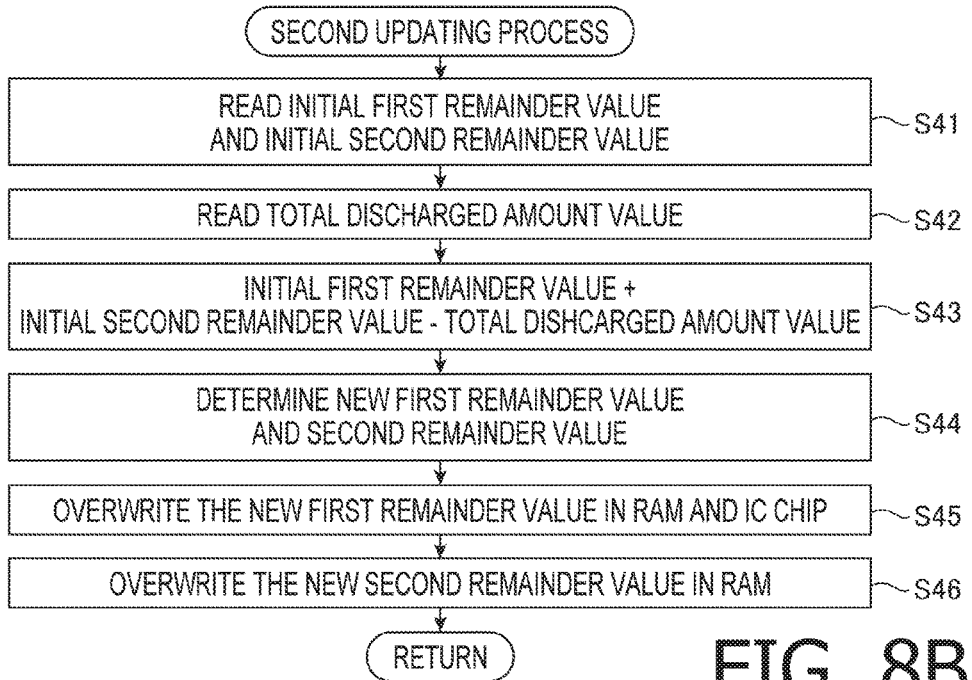

In the second updating process shown in FIG. 8B, the controller 130 may determine new values for the first remainder value and the second remainder value based on a discharged amount value, which indicates an amount of the ink discharged in the image forming in the past. The discharged amount value for the ink may be obtained, for example, by multiplying a voltage value, which may define a size of an ink droplet to be discharged from the head 21, by a quantity of ink droplets having been discharged in the image forming in the past. The controller 130 may calculate the discharged amount value each time when the controller 130 commands the head 21 to discharge the ink. The discharged amount values may be accumulated from the time of the exchange of the cartridges 200 up to the current moment. The accumulated discharged amount values will be called as a total discharged amount value. In other words, the total discharged amount value is a sum of the amount of the ink consumed by the head 21 from the time of the exchange of the cartridges 200 up to the current moment. The total discharged amount value may be stored in the EEPROM 134.

In the second updating process, in S41, the controller 130 reads the initial first remainder value in either the RAM 133 or the EEPROM 134 and reads the initial second remainder value in either the RAM 133 or the EEPROM 134. In S42, the controller 130 reads the total discharged amount value in the EEPROM 134. In S43, the controller 130 adds the initial first remainder value and the initial second remainder value read in S42 to calculate an initial total remainder value and subtracts the total discharged amount value from the initial total remainder value to calculate a current total remainder value. In S44, the controller 130 determines new values for the first remainder value and the second remainder value based on the formulas or the table, in the same manner as S34 in FIG. 8A.

In S45, the controller 130 stores the newly determined first remainder value in the RAM 133 and in the memory device in the IC chip 247 to overwrite the existing first remainder value in the memory device. Moreover, in S46, the controller 130 stores the newly determined second remainder value in the RAM 133. The second updating process ends thereat. The flow returns to S19 in FIG. 7.

Following the second updating process in S19, in S22, the controller 130 determines whether a next image to be printed on a new sheet is in queue. If the next image is in queue (S22: YES), the flow repeats S11 and the steps onward. If no next image is in queue (S22: NO), the image forming process ends thereat.

The first remainder value and the second remainder value may not necessarily be determined in the method described above but may be determined in a different method.

In S11, if the controller 130 determines that the S_Empty flags is off (S11: OFF), the controller 130 proceeds to S16, S17, and S18. In S18, if the controller 130 determines that the liquid-level signals changed from the lower level (L) to the higher level (H) (S18: L->H), in other words, if the controller 130 determines that the ink in the cartridge 200 is exhausted, in S20, the controller 130 conducts a third updating process.

[Third Updating Process]

Figure 8C:
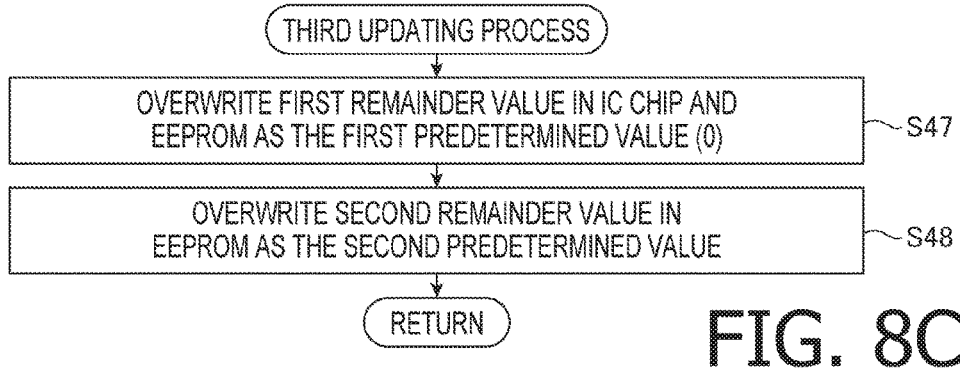

In the third updating process shown in FIG. 8C, the controller 130 may update the first remainder value and the second remainder value with a first predetermined value and a second predetermined value, respectively. That is, the discharged amount value indicating the estimated amount of the ink having been consumed in the image printing in the past may be different from an actual amount of the ink having been consumed. In this regard, the first remainder amount and the second remainder amount, which are updated each time an image is printed on a sheet, may contain accumulated differences. The third updating process may eliminate the differences contained in the first remainder amount and the second remainder amount.

In S47, the controller 130 writes the first predetermined value over the initial first remainder value having been stored in the memory device in the IC chip 247. The first predetermined value may be, for example, zero (0). In S48, the controller 130 saves the second predetermined value as the initial second remainder value in the EEPROM 134 and the RAM 133. The third updating process ends thereat. The second predetermined value indicates an amount of the ink in the liquid compartment 171 in the tank 160 when the level of the ink in the liquid compartment 171 is at the threshold position P and may be prepared in advance in the ROM 132.

Following the third updating process in S20, in S22, the controller 130 determines whether a next image to be printed on a new sheet is in queue. If the next image is in queue (S22: YES), the flow returns to S11 and proceeds to the steps onward. If no next image is in queue (S22: NO), the image forming process ends thereat.

In S11, if the controller 130 determines that the S_Empty flags is off (S11: OFF), the controller 130 proceeds to S16, S17, and S18. In S18, if the controller 130 determines that the liquid-level signal stay unchanged at the higher level (H) (S18: H->H), in S21, the controller 130 conducts a fourth updating process. In other words, once the ink in the cartridge 200 is exhausted, and until the cartridge 200 is exchanged with a new cartridge 200, the controller 130 repeats the fourth updating process.

[Fourth Updating Process]

Figure 8D:
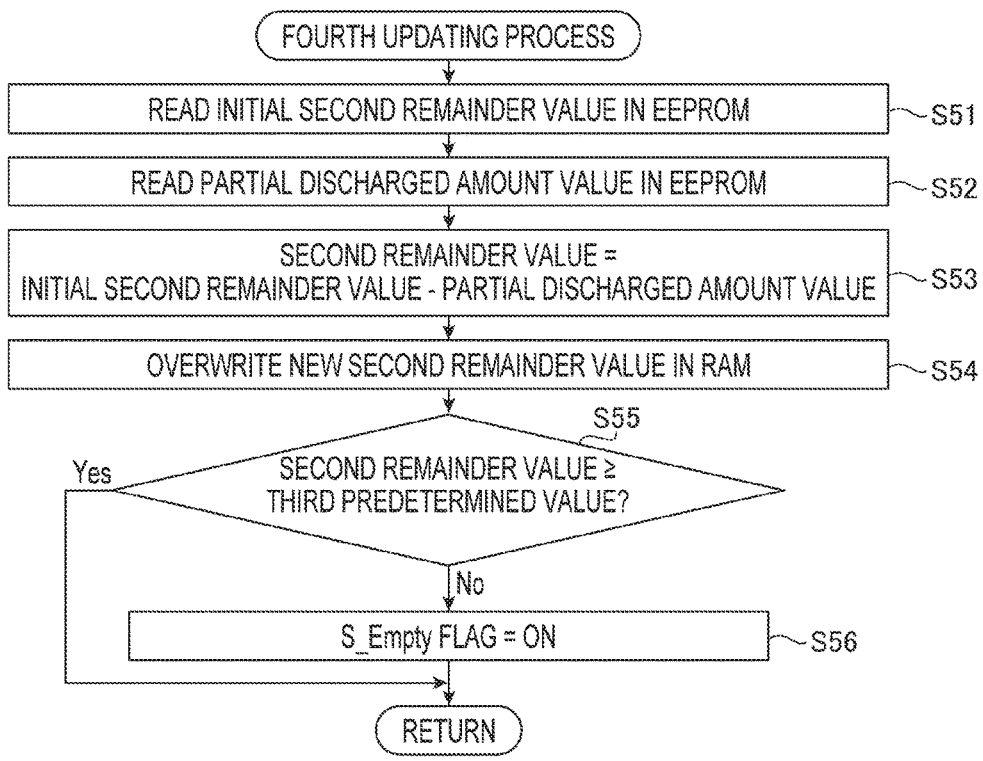

In the fourth updating process shown in FIG. 8D, the controller 130 calculates a value for the second remainder value and determine whether the calculated second remainder value indicates an amount, which is sufficient for printing an image continuously. In particular, in SM, the controller 130 reads the initial second remainder value in either the RAM 133 or the EEPROM 134. In S52, the controller 130 reads a partial discharged amount value in the EEPROM 134. The partial discharged amount value indicates a sum of the amounts of the ink discharged by the head 21 from the time, when the signals from the liquid-level sensor 155 changed from the lower-level (L) to the higher level (H), up to the current moment. In S53, the controller 130 subtracts the partial discharged amount value from the initial second remainder value read in SM to calculate a new value for the second remainder value.

In S54, the controller 130 writes the new value for the second remainder value calculated in S53 over the existing second remainder value in the RAM 133 read in SM. Meanwhile, the first remainder value stays the same, without being overwritten, as the first predetermined value, i.e., zero (0), until the cartridge 200 is exchanged with a new cartridge 200.

In S55, the controller 130 determines whether the new second remainder value is greater than or equal to a third predetermined value, which may be prepared in advance in the EEPROM 134.

In S55, if the controller 130 determines that the second remainder value is greater than or equal to the third predetermined value, in other words, if the image is continuously printable (S55: YES), skips S56 and ends the fourth updating process thereat. On the other hand, if the controller 130 determines that the second remainder value is smaller than the third predetermined value, in other words, if the image may not be continuously printed (S55: NO), in S56, the controller 130 sets the S_Empty flag on and ends the fourth updating process thereat.

In the image forming process, as described above, the first remainder value and the second remainder value may be determined based on the amount of the ink consumed each time when an image is printed on a sheet. Meanwhile, the first remainder value and the second remainder value may not necessarily be updated on a sheet basis but may be updated on basis of a different unit, for example, each time a row of image is printed in a path on a sheet. Moreover, the second updating process, the third updating process, and the fourth updating process may be conducted not only when an image is printed but also when the inks are discharged from the heads 21 for, for example, maintenance or cleaning.

[Average Usage Value Determining Process]

The controller 130 may meanwhile conduct an average usage value determining process shown in FIG. 9. In the average usage value determining process, an average usage value indicating a quantity of sheets used for printing images in the past per unit amount of the ink.

The controller 130 stands by until image printing starts (S61: NO). In this regard, the average usage value determining process may be triggered by start of image printing. When the controller 130 determines that image printing starts (S61: YES), in S62, the controller 130 counts a current discharged amount value indicating the amount of the ink currently discharged from the head 21 since the start of image printing in S61 and a quantity of printed sheets used for image printing since the start of image printing in S61. The controller 130 continues counting (S62) until the image printing is completed (S63: NO).

In S63, when the controller 130 determines that the image printing is completed (S63: YES), in S64, the controller 130 reads a total printed quantity, which is a sum of the sheets used in the past image printing from the time of the exchange of the cartridges 200, and the total discharged amount value existing in the RAM 133 or the EEPROM 134.

In S65, the controller 130 adds the printed sheet quantity counted in S62 to the total printed quantity read in S64 and writes the sum of the printed quantity and the total printed quantity over the existing total printed quantity in the EEPROM 134 to update the total printed quantity. In S65, further, the controller 130 adds the current discharged amount value counted in S62 to the total discharged amount value read in S64 and writes the summed discharged amount values over the existing total discharged amount value in the EEPROM 134 to update the total discharged amount value.

In S66, the controller 130 divides the updated total printed quantity by the updated total discharged amount value to obtain an average usage value, which indicates a printable quantity per unit amount of the ink. In S67, the controller 130 saves the average usage value in the RAM 133 and writes the average usage value over the existing average usage value in the EEPROM 134.

[Objects Determining Process]

The controller 130 determining the first remainder value and the second remainder value in the image forming process (see FIG. 7) may proceed to an objects determining process shown in FIG. 10 and described in the following paragraphs. In the objects determining process, the controller 130 may determine whether the twenty-first object 271, e.g., the exclamation mark (!), the twenty-second object 272, e.g., the cross-out mark (x), the twenty-fourth object, e.g., the exclamation mark (!), or the twenty-fifth object, e.g., the cross-out mark (x) should be displayed or not, and lengths of the seventeenth object 267 and the eighteenth object 268.

In the objects determining process shown in FIG. 10, in S71, the controller 130 reads the latest first remainder value and the latest second remainder value stored in the RAM 133. In S72, the controller 130 reads the value in the S_Empty flag to determine whether the amount of the remaining ink is sufficient to continue and print an image on a sheet.

In S72, if the controller 130 determines that the S_Empty flag is on (S72: ON), in S73, the controller 130 determines the length of the bar in the seventeenth object 267 to be none (zero: 0), and in S74, the controller 130 determines the length of the bar in the eighteenth object 268 to be none (zero: 0). Further, in S75, the controller 130 determines that the twenty-second object 272 (cross-out mark: x) and the twenty-fifth object 275 (cross-out mark: x) to be displayed. The objects determining process ends thereat.

In S72, if the controller 130 determines that the S_Empty flag is off (S72: OFF), in other words, if the amount of the remaining ink is sufficient to print an image on a sheet, in S76, the controller determines the value from the liquid-level sensor 155. In other words, the controller 130 determines whether the ink in the cartridge 200 is exhausted.

In S76, if the controller 130 determines that the value from the liquid-level sensor 155 indicates the higher level (H) (S76: H), in other words, the ink in the cartridge 200 is exhausted, in S77, the controller 130 determines the length of the bar in the seventeenth object 267 to be none (zero: 0), and in S78, the controller 130 determines to display the twenty-first object 271 and the twenty-fourth object 274, which may include the exclamation mark (!). In S79, the controller 130 determines the length of the bar in the eighteenth object 268 in accordance with the second remainder value read in S71. The objects determining process ends thereat. Thus, once the ink in the cartridge 200 is exhausted, solely the eighteenth object 268 may change the forms thereof to reflect the amount of the ink in the tank 160 thereafter. Therefore, the user's attention may be focused on the eighteenth object 268 rather than the seventeenth object 267 object 252.

In S76, on the other hand, if the controller 130 determines that the value from the liquid-level sensor 155 indicates the lower level (S76: L), in other words, if the ink in the cartridge 200 is not exhausted, in S70, the controller 130 determines the length of the bar in the seventeenth object 267 in accordance with the first remainder value read in S71. In S81, the controller 130 determines the length of the bar in the eighteenth object 268 to be a maximum length for the bar. The objects determining process ends thereat.

The controller 130 may conduct the objects determining process shown in FIG. 10 each time the controller 130 conducts the image forming process shown in FIG. 7.

The controller 130 may moreover conduct one of printable quantity determining processes, which are described in the following paragraphs and as shown in FIGS. 11A-11B. In the printable quantity determining processes, the printable quantity is determined based on the first remainder value and the second remainder value updated in the image forming process (see FIG. 7) and the average usage value updated in the average usage value determining process (see FIG. 9).

[Printable Quantity Determining Process (ISO Equivalent)]

In the following paragraphs, described will be the printable quantity determining process (ISO equivalent).

As shown in FIG. 11A, in S82, the controller 130 reads the IC chip 247 in the cartridge 200 for the type information of the cartridge 200. In S83, the controller 130 extracts a standard usage value for the cartridge 200 from the type information. The standard usage value indicates a quantity of sheets per unit amount of ink printable in the test method prescribed by ISO. The standard usage value may be prepared in advance in a table in association with the type information and stored in the EEPROM 134.

In S84, the controller 130 reads the first remainder value and the second remainder value in the RAM 133 and, in S85, calculates the printable quantity (ISO equivalent) based on the first remainder value and the second remainder value in the RAM 133 read in S84. In particular, the controller 130 sums the first remainder value and the second remainder value to calculate the total remainder value. Further, the controller 130 may multiply the total remainder value by the standard usage value to calculate the printable quantity (ISO equivalent). In S86, the controller 130 saves the printable quantity (ISO equivalent) in the RAM 133 and the EEPROM 134. The printable quantity determining process ends (ISO equivalent) thereat. The controller 130 may conduct the printable quantity determining process (ISO equivalent) each time the controller 130 conducts the image forming process shown in FIG. 7.

[Printable Quantity Determining Process (Consumption Basis)]

As shown in FIG. 11B, in S91, the controller 130 reads the average usage value in the EEPROM 134 and, in S92, reads the first remainder value and the second remainder value in the RAM 133. In S93, the controller 130 calculates the printable quantity (consumption basis) based on the average usage value, the first remainder amount, and the second remainder amount having been read. In particular, the controller 130 sums the first remainder value and the second remainder value to calculate the total remainder value. Further, the controller 130 multiplies the total remainder value by the average usage value to calculate the printable quantity (consumption basis). In S94, the controller 130 saves the printable quantity (consumption basis) in the RAM 133 and the EEPROM 134 and ends the printable quantity determining process (consumption basis). The controller 130 may conduct the average usage value determining process shown in FIG. 9 and the printable quantity determining process (consumption basis) shown in FIG. 11B each time the controller 130 conducts the image forming process shown in FIG. 7.

[Ink Remainder Indication Displaying Process]

The controller 130 may conduct an ink remainder indication displaying process as shown in FIG. 12 using the printable quantity determined in one of the printable quantity determining processes (see FIGS. 11A-11B).

In S101, the controller 130 determines whether the current selection for displaying the printable quantity is on basis of the ISO standard or the ink consumption. If the controller 130 determines the ISO standard basis is currently selected (S101: ISO equivalent), in S102, the controller 130 reads the printable quantity (ISO equivalent) in the RAM 133 or the EEPROM 134. In S103, the controller 130 generates the first ink remainder indication screen (see FIG. 14A) containing the first object 251, which indicates the printable quantity (ISO equivalent), and control the display 28 to display the generated first ink remainder indication screen. The ink remainder indication displaying process ends thereat.

In S101, on the other hand, if the controller 130 determines that the consumption basis is currently selected (S101: consumption basis), in S104, the controller 130 reads the printable quantity (consumption basis) in the RAM 133 or the EEPROM 134. In S105, the controller 130 generates the second ink remainder indication screen (see FIG. 14B) containing the second object 252, which indicates the printable quantity (consumption basis), and control the display 28 to display the generated second ink remainder indication screen. The ink remainder indication displaying process ends thereat.

[Benefits by the Embodiment]

According to the embodiment described above, either the first ink remainder indication screen, containing the first object 251 that indicates the printable quantity (ISO equivalent), or the second ink remainder indication screen, containing the second object 252 that indicates the printable quantity (consumption basis), may be displayed in the display 28. Moreover, through the third object 253 containing the character string "change setting," the eleventh object 261, or the twelfth object 262, the user may select whether the first ink remainder indication should be displayed or the second ink remainder indication screen should be displayed in the display 28. Therefore, the printable quantity according to the method preferred by the user may be displayed in the display 28.

According to the embodiment described above, the fourth object 254, which explains that the printable quantity being displayed is based on the ISO standard, may be displayed along with the first object 251 in the display 28. Therefore, the user may recognize that the printable quantity being displayed is based on the ISO standard easily.

According to the embodiment described above, the fifth object 255, which explains that the printable quantity being displayed is based on the past ink consumption, may be displayed along with the second object 252 in the display 28. Therefore, the user may recognize that the printable quantity being displayed is based on the past ink consumption easily.

According to the embodiment described above, the first information screen, which contains description concerning the calculation method of the printable quantity based on the ISO standard, may be displayed by a tapping action on the sixth object 256 in the first ink remainder indication screen. Meanwhile, the second information screen, which contains description concerning the calculation method of the printable quantity based on the ink consumption, may be displayed by a tapping action on the seventh object 257 in the second ink remainder indication screen. Therefore, the user may recognize the bases for the printable quantities easily.

According to the embodiment described above, the change setting screen, through which the user may select whether the printable quantity (ISO equivalent) should be displayed or the printable quantity (consumption basis) should be displayed, may be displayed by a tapping action on the third object 253 in the first information screen. Meanwhile, the change setting screen may be displayed by a tapping action on the third object 253 in the second information screen, which contains the information concerning the printable quantity (consumption basis). In other words, the screen in the display 28 may be switched to the change setting screen from either the first information screen, which contains the information concerning the printable quantity (ISO equivalent), and the second information screen, which contains the information concerning the printable quantity (consumption basis). Therefore, the user may switch the indication of the printable quantity between the printable quantity (ISO equivalent) and the printable quantity (consumption basis) easily. In this regard, usability of the printer 10 to the user may be improved.

According to the embodiment described above, by a tapping action on the eleventh object 261 in the change setting screen, the printable quantity (ISO equivalent) may be determined to be displayed, and the first information screen may be displayed in the display 28. On the other hand, by a tapping action on the twelfth object 262 in the change setting screen, the printable quantity (consumption basis) may be determined to be displayed, and the second information screen may be displayed in the display 28. As the first information screen or the second information screen is displayed, the user may be given an opportunity to change or select the setting in the printable quantity once again. Therefore, if, for example, the user erroneously selects an unintended setting for the printable quantity, the user may not need to return to the first ink remainder indication screen or to the second ink remainder indication but may select an intended setting for the printable quantity through the change setting screen. In this regard, usability of the printer 10 may be improved. In this regard, usability of the printer 10 to the user may be improved.

According to the embodiment described above, after changing the settings for the printable quantity, the first ink remainder indication screen may be displayed in the display 28 by a tapping action on the thirteenth object 263 in the first information screen. Moreover, after changing the settings for the printable quantity, the second ink remainder indication screen may be displayed in the display 28 by a tapping action on the fourteenth object 264 in the second information screen. With the first ink remainder indication screen or the second ink remainder indication screen being displayed, the user may recognize that the settings have been changed. In this regard, an incorrect setting for the printable quantity may be prevented. In this regard, usability of the printer 10 to the user may be improved.

According to the embodiment described above, the detailed information to explain the printable quantity (ISO equivalent) and the printable quantity (consumption basis) may be displayed in the display 28 by a tapping action on the fifteenth object 265. While the detailed information concerning the printable quantity (ISO equivalent) and the printable quantity (consumption basis) printable is displayed in the single screen, the user may recognize the difference between the printable quantity (ISO equivalent) and the printable quantity (consumption basis) clearly. Therefore, the user may select the preferred setting for the printable quantity between the printable quantity (ISO equivalent) and the printable quantity (consumption basis) without difficulty, and usability of the printer 10 to the user may be improved.

According to the embodiment described above, the printable quantity (ISO equivalent) or the printable quantity (consumption basis) may be displayed along with the indication of the remainder amount of the ink in the cartridge 200 and the remainder amount of the ink in the tank 160. Therefore, the user may recognize the ink remainder amount and the printable quantity concurrently. In this regard, usability of the printer 10 to the user may be improved.

Modified Example

Although examples of carrying out the invention has been described, those skilled in the art will appreciate that there are numerous variations and permutations of the image forming apparatus and the computer-readable storage medium that fall within the spirit and scope of the invention as set forth in the appended claims.

For example, the average usage value determined in the average usage value determining process (see FIG. 9) may be resettable. For example, a resetting object (not shown), through which the average usage value may be cleared and reset, may be displayed in the change setting screen (see FIG. 16A). A tapping action on the resetting object by the user may cause the average usage value to be reset. For example, the controller 130 may overwrite the total printed quantity, the total discharged amount value, and the average usage value in the EEPROM 134 by zero (0). For another example, alternately to the resetting object, a reset-all button to initialize the entire data may be provided, or a reset-all object may be displayed in the display 28.

[Benefits by the Modified Example]

By resetting the average usage value, a new average usage value may be provided when, for example, the user changes the styles to use the printer 10, or a user different from the past user is using the printer 10.

More Examples

For another example, the second object 252 to be displayed in the second ink remainder indication screen (see FIG. 14B) may be hidden, or not be displayed, depending on the total printed quantity or the total discharged amount value counted in the average usage value determining process (see FIG. 9). In particular, the average usage value, which is calculated at the beginning of image printing (S61), may vary largely each time the printer 10 is used. If the average usage value varies largely, the printable quantity (consumption basis) indicated by the second object 252 may tend to vary largely as well, which may be confusing to the user. In this regard, the controller 130 in the printer 10 may determine whether the total printed quantity or the total discharged amount value is greater than or equal to a predetermined threshold value prepared in the EEPROM 134. When the controller 130 determines that the total printed quantity or the total discharged amount value is greater than or equal to the predetermined threshold value, the controller 130 may determine to display the second object 252. On the other hand, when the controller 130 determines that the total printed quantity or the total discharged amount value is smaller than the predetermined threshold value, the controller 130 may determine not to display the second object 252. Thus, the second object 252, which may vary largely each time the printer 10 is used, may not be displayed in the second ink remainder indication screen when the total printed quantity or the total discharged amount value is smaller than the predetermined threshold value. Therefore, the user may be prevented from confusion or concerns that the printer 10 may have a technical problem.

Moreover, when the controller 130 determines that the total printed quantity or the total discharged amount value is smaller than the predetermined threshold value, the controller 130 may display the first ink remainder indication screen (see FIG. 14A) rather than the second ink remainder indication screen (see FIG. 14A). In this case, an object, which conveys a message that the printable quantity (ISO equivalent) should be displayed in place of the printable quantity (consumption basis) until the total printed quantity or the total discharged amount value exceeds the threshold value, may be displayed in place of the ninth object 259 or along with the ninth object 259 in the display 28.

For another example, the colorant to be used to form images on sheets in the printer 10 may not necessarily be limited to ink, but may be, for example, toner.

For another example, the ink in the cartridge 200 may not necessarily be conveyed to the tank 160 by the effect of the hydraulic difference but may be conveyed by, for example, the effect of gravity or a driving mechanism such as a pump. When the ink is to be conveyed from the cartridge 200 to the tank by the driving mechanism, the tank may be mounted on, for example, the head 21.

For another example, the printer 10 may not necessarily be equipped with both the cartridge 200 and the tank 160 but may be equipped with the tank 160 alone or the cartridge 200 alone. If, for example, the printer 10 is equipped with the tank 160 alone, a remainder amount of the ink remaining in the tank 160 when the signals from the liquid-level sensor 155 shifts from the lower level (L) to the higher level (H) may be determined to be the initially filled amount. For another example, the initially filled amount value may be manually input by the user in the controller 130 when the user loads the ink in the tank 160. The controller 130 may calculate the second remainder value based on the initially filled amount value and the total discharged amount value and display the printable quantity calculated on the ISO equivalent basis or the consumption basis.

For another example, the standard usage value and the average usage value may not necessarily indicate the printable quantities per unit amount of the ink but may indicate, for example, a standard amount and an average amount of the ink to be used to print an image on a single sheet. In other words, the standard usage value and the average usage value may be any values as long as the printable quantity is derivable from the values.

For another example, the screen in the display 28 may not necessarily be switchable from the first ink remainder indication screen to the second ink remainder indication screen, or from the second ink remainder indication screen to the first ink remainder indication screen, through the intervening first information screen, second information screen, or the change setting screen. In other words, the screen in the display 28 may be switchable from the first ink remainder indication screen to the second ink remainder indication screen and from the second ink remainder indication screen to the first ink remainder indication screen directly. For another example, the screen in the display 28 may be switchable from the first ink remainder indication screen to the second ink remainder indication screen and from the second ink remainder indication screen to the first ink remainder indication screen through another intervening screen other than the first information screen, second information screen, or change setting screen.

What is claimed is:

1. An image forming apparatus, comprising:
    a recorder connected with a container configured to store a colorant;
    a display;
    an input interface;
    a memory; and
    a controller, configured to:
        control the recorder to consume the colorant to print images on sheets;
        count a consumption value reflecting an amount of the colorant consumed by the recorder and a quantity of the sheets used to print the images;
        determine an average usage value based on the consumption value and the quantity of the sheets;
        obtain a filled amount value indicating an amount of the colorant filled in the container and determine a first printable quantity based on the obtained filled amount value, the counted consumption value, and a standard usage value stored in the memory;
        determine a second printable quantity based on the filled amount value, the consumption value, and the average usage value;
        control the display to display a first screen including a first object in the display, the first object indicating the first printable quantity;
        control the display to display a second screen including a second object in the display, the second object indicating the second printable quantity; and
        control the display to display a screen including a third object, through which one of the first object and the second object to be displayed in the display is selectable.

2. The image forming apparatus according to claim 1, wherein the controller is further configured to:
    control the display to display the first screen including the first object and a fourth object, the fourth object expressing the first object being displayed indicates the first printable quantity; and
    control the display to display the second screen including the second object and a fifth object, the fifth object expressing the second object being displayed indicates the second printable quantity.

3. The image forming apparatus according to claim 2, wherein the input interface includes a touch sensor laid over the display;
wherein the controller is configured to detect a position of a touching action on an object being displayed in the display in response to input from the touch sensor;
wherein the controller is configured to:
    control the display to display the first screen including the first object and a sixth object in the display;
    control the display to display the second screen including the second object and a seventh object in the display;
    control the display to display a third screen including an eighth object in response to detection of a touching action on the sixth object, the eighth object including information concerning a calculation method for the first printable quantity; and
    control the display to display a fourth screen including a ninth object in response to detection of a touching action on the seventh object, the ninth object including information concerning a calculation method for the second printable quantity.

4. The image forming apparatus according to claim 3, wherein the controller is configured to:
    control the display to display the third object in the third screen;
    control the display to display the third object in the fourth screen; and
    control the display to display a fifth screen including a tenth object in response to detection of a tapping action on the third object, the tenth object indicating that one of the first printable quantity and the second printable quantity to be displayed in the display is selectable.

5. The image forming apparatus according to claim 4, wherein the controller is configured to:
    control the display to display the fifth screen including an eleventh object, the eleventh object expressing that the first printable quantity is to be displayed, and a twelfth object, the twelfth object expressing that the second printable is to be displayed;
    control the display to display the third screen in response to detection of a touching action on the eleventh object; and
    control the display to display the fourth screen in response to detection of a touching action on the twelfth object.

6. The image forming apparatus according to claim 5, wherein the controller is configured to:
control the display to display a thirteenth object in the third screen;
control the display to display a fourteenth object in the fourth screen;
control the display to display the first screen in response to detection of a touching action on the thirteenth object; and
control the display to display the second screen in response to detection of a touching action on the fourteenth object.

7. The image forming apparatus according to claim 6, wherein the controller is configured to:
control the display to display the fifth screen including a fifteenth object, the fifteenth object indicating connection to a sixth screen; and
control the display to display the sixth screen including a sixteenth object in response to detection of a touching action on the fifteenth object, the sixteenth object including descriptive information concerning the first printable quantity and the second printable quantity.

8. The image forming apparatus according to claim 1, wherein the controller is configured to reset the average usage value in response to a resetting command input through the input interface.

9. The image forming apparatus according to claim 1, wherein the container comprises:
a cartridge comprising a first compartment to store the colorant; and
a tank connected with the cartridge through a first channel and with the recorder through a second channel, the tank comprising a second compartment to store the colorant.

10. The image forming apparatus according to claim 9, wherein the container comprises a plurality of containers, each of which comprises the cartridge and the tank.

11. The image forming apparatus according to claim 9, wherein the controller is configured to:
control the display to display the first screen including the first object, a fourth object, the fourth object indicating a first remainder amount being an amount of the colorant stored in the first compartment in the cartridge, and a fifth object, the fifth object indicating a second remainder amount being an amount of the colorant stored in the second compartment in the tank; and
control the display to display the second screen including the second object, the fourth object, and the fifth object.

12. The image forming apparatus according to claim 11, wherein the controller is configured to:
read a first remainder value indicating the first remainder amount and a second remainder value indicating the second remainder amount from the memory;
calculate a total remainder value by subtracting the consumption value from sum of the first remainder value and the second remainder value;
determine an updated first remainder value and an updated second remainder value based on the calculated total remainder value;
store the updated first remainder value and the updated second remainder value in the memory; and
determine a form of the fourth object reflecting the updated first remainder value and a form of the fifth object reflecting the updated second remainder value.

13. The image forming apparatus according to claim 9, wherein the standard usage value indicates a quantity of sheets printable per unit amount of the colorant;
wherein the controller is configured to:
read a first remainder value indicating an amount of the colorant stored in the first compartment in the cartridge and a second remainder value indicating an amount of the colorant stored in the second compartment in the tank from the memory;
calculate a total remainder value by subtracting the consumption value from sum of the first remainder value and the second remainder value;
determine an updated first remainder value and an updated second remainder value based on the total remainder value;
store the updated first remainder value and the updated second remainder value in the memory; and
determine the first printable quantity by multiplying the total remainder value by the standard usage value.

14. The image forming apparatus according to claim 9, wherein the average usage value indicates a quantity of sheets printable per unit amount of the colorant;
wherein the controller is configured to:
read a first remainder value indicating an amount of the colorant stored in the first compartment in the cartridge and a second remainder value indicating an amount of the colorant stored in the second compartment in the tank from the memory;
calculate a total remainder value by subtracting the consumption value from sum of the first remainder value and the second remainder value;
determine an updated first remainder value and an updated second remainder value based on the total remainder value;
store the updated first remainder value and the updated second remainder value in the memory;
determine the average usage value by dividing the counted quantity of the sheets used to print the images by the consumption value; and
determine the second printable quantity by multiplying the total remainder value by the average usage value.

15. A non-transitory computer readable storage medium storing computer readable instructions that are executable by a computer in an image forming apparatus, the image forming apparatus comprising a recorder connected with a container configured to store a colorant, a display, an input interface, and a memory, the computer readable instructions, when executed by the computer, causing the computer to:
control the recorder to consume the colorant to print images on sheets;
count a consumption value reflecting an amount of the colorant consumed by the recorder and a quantity of the sheets used to print the images;
determine an average usage value reflecting the consumption value and the quantity of the sheets;
obtain a filled amount value indicating an amount of the colorant filled in the container and determine a first printable quantity reflecting the obtained filled amount value, the counted consumption value, and a standard usage value stored in the memory;
determine a second printable quantity reflecting the filled amount value, the consumption value, and the average usage value;

control the display to display a first screen including a first object in a first screen in the display, the first object indicating the first printable quantity;

control the display to display a second screen including a second object in the display, the second object indicating the second printable quantity; and control the display to display a screen including a third object, through which one of the first object and the second object to be displayed in the display is selectable.

* * * * *